(12) United States Patent
Stoustrup et al.

(10) Patent No.: US 12,555,325 B2
(45) Date of Patent: Feb. 17, 2026

(54) METHOD AND SYSTEM FOR INTERACTIVELY RENDERING DIGITAL DENTAL MODELS

(71) Applicant: 3SHAPE A/S, Copenhagen K (DK)

(72) Inventors: Asger Stoustrup, Copenhagen K (DK); Daniella Alalouf, Copenhagen K (DK); Aleksandar Cebov, Copenhagen K (DK)

(73) Assignee: 3SHAPE A/S, Copenhagen (DK)

( * ) Notice: Subject to any disclaimer, the term of this patent is extended or adjusted under 35 U.S.C. 154(b) by 3 days.

(21) Appl. No.: 18/002,062

(22) PCT Filed: May 24, 2022

(86) PCT No.: PCT/EP2022/064112
§ 371 (c)(1),
(2) Date: Dec. 16, 2022

(87) PCT Pub. No.: WO2022/248502
PCT Pub. Date: Dec. 1, 2022

(65) Prior Publication Data
US 2024/0054729 A1    Feb. 15, 2024

(30) Foreign Application Priority Data

May 26, 2021    (EP) .................................... 21176023

(51) Int. Cl.
G06T 19/00    (2011.01)
G06T 7/00    (2017.01)
G06T 15/00    (2011.01)

(52) U.S. Cl.
CPC ............... *G06T 19/00* (2013.01); *G06T 7/00* (2013.01); *G06T 15/005* (2013.01); *G06T 2207/30036* (2013.01)

(58) Field of Classification Search
CPC ......... G06T 19/00; G06T 7/00; G06T 15/005; G06T 2207/30036
See application file for complete search history.

(56) References Cited

U.S. PATENT DOCUMENTS

2004/0019772 A1    1/2004    Ueki et al.
2007/0273711 A1    11/2007    Maffei
(Continued)

FOREIGN PATENT DOCUMENTS

WO    2020182880 A1    9/2020

OTHER PUBLICATIONS

Youtube channel Junhee & Victor, "3shape TRIOS Patient Monitoring Wear and Ortho"—youtube.com/watch?v=rGfbgiGfybl, published Apr. 7, 2020 (Year: 2020).*
(Continued)

*Primary Examiner* — Ross Varndell
*Assistant Examiner* — Nhut Huy Pham
(74) *Attorney, Agent, or Firm* — BUCHANAN INGERSOLL & ROONEY PC

(57) ABSTRACT

A computer implemented method for rendering digital three-dimensional dental models includes receiving a first digital 3D dental model including a first dental information of a patient; receiving a second digital 3D dental model including a second dental information of the patient; generating, in the digital 3D space, a superimposed model by superimposing one of the first digital 3D dental model or the second digital 3D dental model on another of the second digital 3D dental model or the first digital 3D dental model; and arranging a 2D controller and the superimposed model relative to each other such that a position of the 2D controller defines a boundary that demarcates the superimposed model between a first zone and a second zone.

27 Claims, 14 Drawing Sheets

(56) References Cited

U.S. PATENT DOCUMENTS

2013/0308861 A1 11/2013 Cordara et al.
2018/0012561 A1 1/2018 Yoon et al.
2018/0125610 A1 5/2018 Carrier, Jr. et al.
2019/0269485 A1 9/2019 Elbaz et al.

OTHER PUBLICATIONS

YouTube channel 3Shape, "3Shape Ortho Analyzer—How to Overlay Two Model Sets"—youtube.com/watch?v=9yMKIJdExoA, published Aug. 10, 2017 (Year: 2017).*
Elfsight website, "Before and After Image Slider"—elfsight.com/before-and-after-slider-widget/, accessed Apr. 7, 2025, published Dec. 24, 2019 (Year: 2019).*
International Search Report (PCT/ISA/210) and Written Opinion (PCT/ISA/237) mailed on Nov. 21, 2022, by the European Patent Office as the International Searching Authority for International Application No. PCT/EP2022/064112. (14 pages).

* cited by examiner

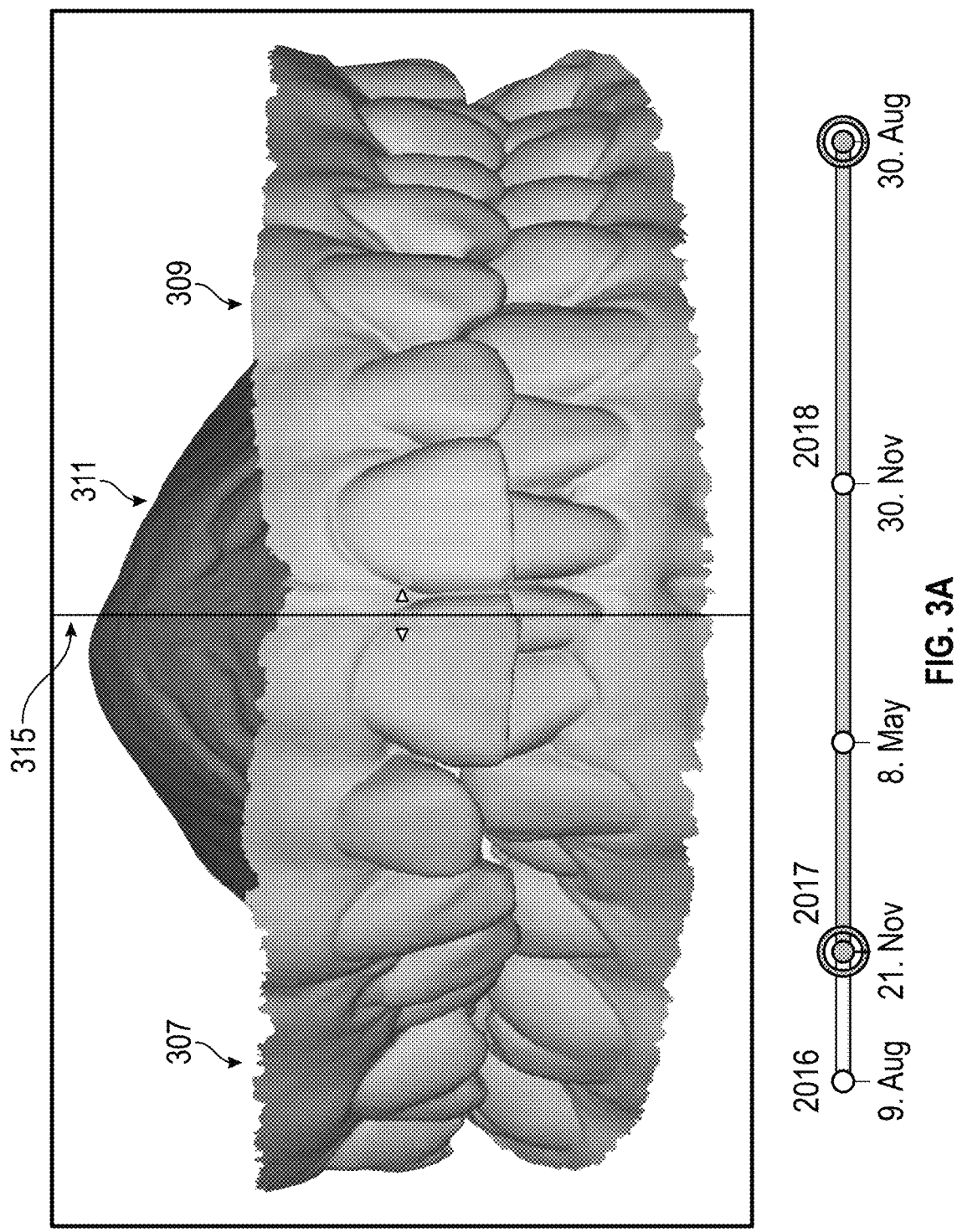

METHOD AND SYSTEM FOR INTERACTIVELY RENDERING DIGITAL DENTAL MODELS

TECHNICAL FIELD

The disclosure relates to a method and system for rendering digital dental models in response to user input. In particular, the disclosure relates to rendering three dimensional dental models, typically obtained at different time points, in a manner that allows the user to compare the three-dimensional dental models through a continued human interaction, such as by user providing an input to produce a relative movement between a 2D controller and a superimposed model comprising the three-dimensional dental models.

BACKGROUND

Conventionally known methods for comparing digital dental models for dental conditions may be less than ideal in at least some instances. For example, dental condition of patient dentition from different time points may be presented in different digital dental models. In one method, these digital dental models may be presented in a side-by-side static manner and the user may visualize the models that are presented side-by-side. In another method, the digital dental models are presented in a manner, such as arranged in a sequence along a timeline, thus allowing the user to toggle between the models. However, rendering models in either of these manners is not ideal for visual assessment of a change in the dental condition. In both alternatives, the models are not presented in a way that allows for establishing correspondences between specific regions across the models. The user is not only expected to mentally determine such correspondences but also keep a mental track of these correspondences when visually inspecting different models. These approaches rely heavily on the skills of an individual user, making evaluation based on conventional approaches subjective and influencing assessment of development of dental condition. None of the approaches, including an approach that superimposes digital dental models, provide technical means to credibly assist the user in a continued guided manner to gradually make region-specific assessment in development of dental condition, thus leading to sub-optimal dental treatment planning. Possibility to determine region-specific development in dental condition along with providing the user with improved interaction with the models during the assessment may be further beneficial if the changes across the models are subtle, thereby allowing for an early and precise determination of development in dental condition.

There is a need to provide an improved method and system to render the models in a way that credibly assist the user to interact with the models during the assessment to objectively examine region specific development in dental conditions.

SUMMARY

According to an embodiment, a computer implemented method for rendering digital three-dimensional dental models of a patient is disclosed. The method includes
receiving, in a digital 3D space, a first digital 3D dental model comprising a first dental information of a patient;
receiving, in the digital 3D space, a second digital 3D dental model comprising a second dental information of the patient, the second dental information being at least partly different from the first dental information;
generating, in the digital 3D space, a superimposed model by superimposing one of the first digital 3D dental model or the second digital 3D dental model on another of the second digital 3D dental model or the first digital 3D dental model; and
arranging, in the digital 3D space, a 2D controller and the superimposed model relative to each other such that a position of the 2D controller relative to a location of the superimposed model defines a boundary that demarcates the superimposed model between a first zone configured to render only at least a part of the first digital 3D dental model from the superimposed model and a second zone configured to render only at least a part of the second digital 3D dental model from the superimposed model.

The method may further include altering, based on a user input received through interaction of the user with the user interface, the relative arrangement (e.g. relative spatial relation) between the 2D controller and the superimposed model to alter the boundary such that the first zone and second zone are changed.

Selective rendering as disclosed above results in solely displaying at least a part of the first digital 3D dental model from the superimposed model in the first zone and displaying at least a part of the second digital 3D dental model from the superimposed model in the second zone.

The term "location" in relation to the superimposed model and "position" in relation to the 2D controller is to be understood to include both placement and orientation of the superimposed model in the 3D space and 2D controller in the 3D space respectively.

Receiving the first digital 3D dental model and second digital 3D dental model generally includes importing, typically in response to a user selection, the first digital 3D dental model and second digital 3D dental model from a database. The first digital 3D dental model and second digital 3D dental model may be acquired directly by optically scanning patient's oral cavity at a specific time point comprising the same time point or different time points. Optically scanning patient's oral cavity may include direct scanning of patient's oral cavity using an intraoral scanner such as TRIOS intra oral scanner from 3Shape AS, Denmark or dental X-ray scanner. The referred dental scanners may use different imaging techniques such as focus scanning, time-of-flight, stereography, confocal scanning, triangulation, Cone Beam Computer Tomography (CBCT) techniques. Alternatively, optically scanning patient's oral cavity may include indirect scanning of patient's oral cavity by scanning a physical dentition model that is produced based on a negative impression of patient's teeth. The physical dentition model may be scanned using desktop dental scanners such as E-series scanners from 3Shape AS, Denmark.

In an embodiment, both the first digital 3D dental model and the second digital 3D dental model are obtained at the same time point. The first digital 3D dental model and the second digital 3D dental obtained at the same time point typically represent related different intraoral objects. In another embodiment, the first digital 3D dental model is obtained at a first time point and the second digital 3D dental model is obtained at a second time point subsequent to the first time point. The first digital 3D dental model and the second digital 3D dental obtained at different time points typically represent the same intraoral object. In an embodiment, the first digital 3D dental model and second digital 3D dental model represents at least a part of the same jaw of the patient.

The first digital 3D dental model and second digital 3D dental model represent same intraoral object or related different intraoral objects. The term "related" refers to the different intraoral object being in an anatomical and/or clinical relationship. The intraoral object may include one or more dental object type. The dental object type includes a jaw, gingiva, palate, at least one dental crown or teeth, dental restoration, dental implant, dental root, dental bone, or a combination thereof. For example, the first digital 3D model and second digital 3D dental model represent same object, where each model includes a jaw comprising gingiva and teeth. These models may be obtained from different time points. In another example, the first digital 3D model and second digital 3D dental model represent related different intraoral object, wherein the first digital 3D dental model includes a jaw comprising gingiva and at least one dental crown and the second digital 3D dental model includes dental root related with the at least one dental crown of the first digital 3D dental model.

The dental information includes at least one of surface information or sub-surface information from the oral cavity of the patient. The surface information or sub-surface information includes dental object information that may include at least one of topographical data such as shape and/or position data, bone data, texture data (e.g. color data of patient's teeth and/or fluorescence data), or data derived from the topographical data and/or texture data. The derived data may include at least one of score such as region-specific score, heat map that corresponds to magnitude, stage or change in a dental condition such as caries or gingival recession. In an embodiment, one of the first dental information or second dental information represents surface information from oral cavity and the other of the first dental information or second dental information represents sub-surface information relating to the oral cavity. In another embodiment, the first dental information represents surface information obtained at the first time point and the second dental information represents surface information from the second time point. In yet another embodiment, the first dental information represents sub-surface information obtained at the first time point and the second dental information represents sub-surface information from the second time point. In any of the preceding embodiments, the first dental information and the second dental information are at least partly different. It may, however, be preferred that the first dental information and second dental information are also at least partly same topographical data. The at least partly same topographical data is configured to be used for superimposing the first digital 3D dental model and second digital 3D dental model.

In an embodiment, the dental information may include data relating to at least one of tooth or gingiva. The data includes at least one of color data, or topographical data representing at least one of shape data or position data. According to an embodiment, at least one of the first dental information or second dental information corresponds to the dental condition of the patient. Accordingly, the second dental information being at least partly different from the first dental information may typically corresponds to a change in the dental condition for the patient between the first time point and second time point. The difference is preferably specific to corresponding regions (e.g. anatomical and/or clinical) between the two digital 3D dental models.

In an embodiment, the method includes processing at least one of the first dental information or second dental information such that the superimposed model comprises at least one of the processed first dental information or processed second dental information.

There may be variations during recording of the texture data at different time points, leading to the obtained texture data that are unsuitable for comparison. Such variations may include at least one of, but not limited to, ambient light in the room where the texture data is recorded or intraoral scanners that are used to record the texture data due to e.g. differences between scanners, between mirrors in different tip, between color calibrations. This would affect any detection and monitoring of patient's dental health because the actual clinically relevant differences may not be properly ascertained. Placing the first texture data and second texture data in the common texture space is particularly helpful because doing so, would at least substantially overcome the problems associated with the variations and allow for a more accurate and reliable visualization and comparison that is based on the first texture data and second texture data.

In an embodiment, the processing at least one of the first dental information or second dental information may include placing the first digital 3D dental model and second digital 3D dental model in a common texture space. The phrase "texture space" may refer to specific organization of texture, such as a color space. The first digital 3D dental model and second digital 3D dental model may be placed in the common texture space by applying at least one texture modifying parameter to at least one of the first digital 3D dental model or second digital 3D dental model. The at least one texture modifying parameter includes at least one transformation operator that is configured to minimize variations between texture values of corresponding regions of the first digital 3D dental model and second digital 3D dental model. In order to place the first digital 3D model and the second digital 3D model in the common texture space, a target texture space is selected/defined. The target texture space includes the texture space of at least one of the first digital 3D model, the second digital 3D model, a standard digital 3D model, or a predefined texture space. The at least one texture modifying parameter may be determined based on the target texture space and the texture space of one or more of the digital 3D models that need to at least substantially match, by uniformization of texture, with the target texture space.

In an embodiment, generating the at least one texture modifying parameter includes first identifying value(s) of texture components from the comparable regions. Such values for defining color may include 3 dimensional vectors and may be represented in different color spaces like RGB, LAB, HSV, etc. RGB is generally the most common color space but preferably, may be represented in the LAB color space through conversion of texture component from one color space to another color space. The identified values may be utilized to determine a difference in values. The method below is disclosed in relation to the RGB color space but may work using other color spaces like LAB color space. A reference table is generated, the reference table includes region specific relationship between values of RGB components in a reference and the model undergoing calibration. An illustrative table is included below.

TABLE 1

| Comparable Regions No. | Reference | Model undergoing calibration | Model undergoing calibration' | ... |
|---|---|---|---|---|
| 1 | C_R1 = (R_R1, G_R1, B_R1) | C_$C_R$1 = (R_$C_R$1, G_$C_R$1, B_$C_R$1) | ... | ... |
| 2 | C_R2 = (R_R2, G_R2, B_R2) | C_$C_R$1 = (R_$C_R$1, G_$C_R$1, B_$C_R$1) | ... | ... |
| 3 | ... | ... | ... | ... | where, C_R1 refers to Color at Region 1 in the reference with R_R1, G_R1, B_R1 representing RGB values for Region 1 in the reference, and C_$C_R$1 refers to Color at Region 1 in the model undergoing calibration with R_$C_R$1, G_$C_R$1, B_$C_R$1 representing RGB values for Region 1 in the model undergoing calibration. It is understandable that such table may include values for other regions such as Region 2 and for other models such as other Model undergoing calibration'.

In different embodiments, the reference is selected from one of the first digital 3D model, the second digital 3D model, a standard digital 3D model, a predefined texture space, or a combination thereof. It is understandable that when a standard digital 3D model, or a predefined texture space is used as reference, then uniformizing texture between first texture data and second texture data will require each of the first texture data and second texture data undergoing calibration, such that the difference in texture values between the first texture data and second texture data is reduced.

Generating the at least one texture modifying parameter may further include determining a difference between the values identified for the comparable regions. The difference may typically be calculated as (as an illustration, the difference is shown for region 1)

$$D(C\_R1, C\_C_R 1) = \mathrm{Sqrt}((R\_R1-R\_C_R 1)^2 + (G\_R1-G\_C_R 1)^2 + (B\_R1-B\_C_R 1)^2)$$

where D(C_R1, C_$C_R$1) represents the difference.

Generating the at least one texture modifying parameter may further include determining transformation operator(s) of texture such as colors to modify texture (e.g. colors) of the model undergoing calibration based on the calculated difference. Such transformation operator(s) may result in minimizing the difference, such as the least average difference, between the texture (e.g. colors) of comparable regions. As an example, the transformation operator(s) may include a 3×3 matrix M applied as $$C\_C_R 1 \text{ calibrated} = M * C\_C_R 1$$

where C_$C_R$1 calibrated texture (e.g. color) after applying the transformation operator(s) M to the pre-calibrated texture of Region 1 in the model undergoing calibration. The transformation operator(s) may also be a 3×3 Matrix combined with an offset, or only an offset or a higher order transformation.

In an embodiment, the first dental information includes a first model boundary defined by gingiva of the patient at the first time point, and the second dental information comprises a second model boundary defined by gingiva of the patient at the second time point. The method further includes processing at least one of the first model boundary or second model boundary by modifying at least one of the first model boundary or second model boundary based on one of at least one modified boundary. This results in a processed data that includes at least one of the first digital 3D model or second digital 3D model comprising a modified gingiva boundary such that at least one of the first model boundary or second model boundary and at least another of the modified gingiva boundary of the first model boundary or modified gingiva boundary of the second model are uniform.

In an embodiment, the method further includes processing at least one of the first dental information or second dental information that includes evaluating at least one the first dental information or second dental information for presence of a dental condition at the first time point and/or second time point respectively. Thus, the processed data may include indication of a dental condition on the respective model.

The region in the disclosure may refer to at least to the smallest entity that defines a digital 3D model. For example, if the digital 3D model is represented as a polygonal mesh, then the region may refer to a facet or may even refer to a vertex. Alternatively, the region may refer to a voxel if the digital 3D model comprises voxels. In some embodiments, the region may also include a collection of regions, i.e. a plurality of smallest entities grouped together, such that any of the disclosed method or its steps is performed on the collection of regions rather than only on the smallest entity. Thus, the collection of regions may be defined by the edges of the outermost facet. In another embodiment, the region may include an underlying mesh defined by edges, vertices, faces corresponding to a surficial portion of the model the processor automatically identifies (e.g. based on segmentation) or with user input (e.g. marking of a surficial portion using a tool available in the user interface). In an event, a comparison between texture data of digital 3D models that are represented differently is needed, then the method may further include transforming at least one the digital 3D models in same representation as the other representation(s) prior to any processing such as comparison. For example, if one digital 3D model is represented as a polygonal mesh and another one in voxels, then at least one of the digital 3D models may be transformed in one of the polygonal mesh representations, voxel representations or any other representations such that all models that need to be compared or presented are in same representation.

In different embodiments, the change in the dental condition includes at least one of at least one tooth having a different tooth position, at least one tooth having a tooth wear, at least one tooth having a different caries condition, gingiva recession, change in gingival inflammation, tooth chipping, or tooth preparation.

According to an embodiment, superimposing includes arranging the first digital 3D dental model and second digital 3D dental model in a fixed spatial relationship while maintaining a first data set corresponding to the first digital 3D dental model and a second data set corresponding to the second digital 3D dental model as distinct data sets after superimposing. According to an embodiment, superimposing comprises arranging the first digital 3D dental model and second digital 3D dental model in a fixed spatial relationship without merging a first data set corresponding to the first digital 3D dental model and a second data set corresponding to the second digital 3D dental model. According to an embodiment, superimposing comprises arranging the first digital 3D dental model and second digital 3D dental model in a fixed spatial relationship such that the first digital 3D dental model and second digital 3D dental model are aligned when viewed from a viewpoint and maintained as separate representations after being arranged, whereby the first digital 3D dental model and second digital 3D dental model are both visualized in the 3D space.

According to an embodiment, superimposing includes arranging the first digital 3D dental model and second digital 3D dental model in a fixed spatial relationship while merging a first data set corresponding to the first digital 3D dental model and a second data set corresponding to the second digital 3D dental model into a single data set.

The fixed spatial relationship refers to anatomical and/or geometrical correspondence between regions of the first digital 3D dental model and second digital 3D dental model. The superimposed model comprising the first digital 3D dental model and second digital 3D dental model places the models in the same coordinate system. This may be achieved by placing one of the first or second digital 3D dental models in the coordinate system of another of the second or first digital 3D dental models, or placing both first and second digital 3D dental models in a separate common coordinate system. Such placement may be achieved by applying specific transformation(s) to one or both models. Such transformation(s) may be determined based on using known techniques such as Iterative Closest Point (ICP). The initial parameter (e.g. reference point) for the ICP may be determined manually and/or automatically. For example, the user may identify a plurality of corresponding points such as three or more points on the two models. These corresponding points are typically chosen from a stable region like rugae or tooth or restoration that is stationary between the two models. The ICP based superimposition may represent a superimposition, which may further be refined by individually moving a model resulting in the superimposed model.

According to an embodiment, superimposing the first digital 3D dental model and second digital 3D dental model in the fixed spatial relationship configures the first digital 3D dental model and second digital 3D dental model to be displayed from the same perspective and further configures the models for simultaneous movement in response to a user input corresponding to moving the superimposed model, relative to the 2D controller placed at a position, to a location in the digital 3D space. The simultaneous movement is typically in same manner, which may include at least one of rotation in the same direction by the same amount, translation in same direction by same amount, or applying same magnification factor.

The term "fixed" encompasses scenarios comprising locking the two dental models such that the first and second digital 3D dental models are configured to be moved together. This may be useful when the relative movement includes moving the superimposed model in the 3D space.

In an embodiment, movement of the superimposed model and/or 2D controller includes at least one of rotating, zooming, or translating the superimposed model and/or 2D controller in the digital 3D space.

In an embodiment, rotating the superimposed model, in response to a user input, includes simultaneously rotating the first digital 3D dental model and second digital 3D dental model in the same direction and by same rotational amount, i.e. defining the simultaneous movement in same manner. In another embodiment, zooming the superimposed model, in response to a user input, includes simultaneously applying same magnification factor to the first digital 3D dental model and second digital 3D dental model, i.e. defining the simultaneous movement in same manner. In another embodiment, translating the superimposed model, in response to user input, includes simultaneously translating the first digital 3D dental model and second digital 3D dental model by same distance along same direction, i.e. defining the simultaneous movement in same manner.

In an embodiment, the user input corresponding to the relative movement includes manually moving at least one of the 2D controller or the superimposed model through direct user interaction with the 2D controller and/or the superimposed model such as by translation, zooming, rotation, etc. Additionally or alternatively, the user input corresponding to the relative movement includes manually entering a value associated with at least one movement parameter, which is useable by a processor that is configured to move at least one of the 2D controller or the superimposed model independent of direct user interaction with the 2D controller and/or the superimposed model. The movement parameter relates to one or more movements such as translation, rotation, zooming, etc. In either embodiment, the relative movement expressing the user input corresponds to a transformation matrix.

The superimposed model comprises the first digital 3D dental model and second digital 3D dental model overlaid/positioned onto each other. In relation to the 2D controller, the superimposed model includes the first zone and second zone on either side of the 2D controller. Thus, the spatial relation of the 2D controller and the superimposed model, i.e. relative position of the 2D controller with respect to the location of the superimposed model, defines the first zone and second zone, where each zone is configured to display only one of the first digital 3D dental model or second digital 3D dental model from the superimposed model. The boundary defined by the position of the 2D controller relative to the superimposed model determines the extent of the first zone and second zone. For example, the 2D controller including a slider is configured to move, based on user input, between two extremum positions. At an extremum position for a 2D controller comprising a slider, only one zone is displayed i.e. only one of the digital 3D dental model is rendered. Conversely, at an opposite extremum position for the 2D controller comprising a slider, only another zone is displayed i.e. only another digital 3D dental model is rendered. However, in different positions between the extremum positions, the superimposed model is demarcated into two different zones, namely the first zone and second zone, whereby in the first zone only at least a part of the first digital 3D dental model from the superimposed model is rendered and in the second zone only at least a part of the second digital 3D dental model from the superimposed model is rendered. As the spatial relation of the 2D controller comprising the slider and the superimposed model is altered based on the user input, the extent of the first zone and second zone is dynamically changed. Accordingly, the rendering of the first digital 3D model and the second digital 3D model from the superimposed model is changed accordingly.

According to an embodiment, arranging the 2D controller and the superimposed model relative to each other includes relative movement, based on a user input, between the superimposed model and 2D controller. The relative movement may be configured to dynamically change the first zone and second zone of the superimposed model, as described in the preceding paragraph with the slider example.

In an embodiment, the user input corresponding to the relative movement includes manually moving at least one of the 2D controller or the superimposed model through direct user interaction with the 2D controller and/or the superimposed model such as by translation, zooming, rotation, etc. Additionally or alternatively, the user input corresponding to the relative movement includes manually entering a value associated with at least one movement parameter, which is useable by a processor that is configured to move at least one of the 2D controller or the superimposed model independent of direct user interaction with the 2D controller and/or the superimposed model. The movement parameter relates to one or more movements such as translation, rotation, zooming, etc.

According to an embodiment, the relative movement includes moving the superimposed model, relative to the 2D controller at a position, to a location in the digital 3D space such that the position of the 2D controller relative to the moved superimposed model defines the boundary for the superimposed model placed at the location. The movement of the superimposed model may be along and/or around one or more of the six degrees of freedom. For example, the superimposed model is configured to move along and/or around an axis in the 3D space, the axis may include at least one of a first axis, second axis, or third axis. Thus, the movement along at least one of the axis may define translation of the superimposed model, whereas the movement around at least one of the axis may define rotation of the superimposed model.

According to an embodiment, the relative movement includes moving the 2D controller, relative to the superimposed model at a location, to a position such that the position of the moved 2D controller defines the boundary for the superimposed model at the location. The movement of the 2D controller may be along and/or around one or more of the six degrees of freedom. For example, the 2D controller is configured to move along and/or around an axis in the 3D space, the axis may include at least one of the first axis, second axis, or third axis of the digital 3D space. Thus, the movement along at least one of the axis may define translation of the 2D controller, whereas the movement around at least one of the axis may define rotation of the 2D controller. Typically, the movement such as the translation of the 2D controller includes moving the 2D controller through a plurality of positions that includes a plurality of discrete separated positions that are configured to allow stepwise movement of the 2D controller, defined by each point, to change the boundary in a stepwise manner or a plurality of continuous adjacent positions that are configured to allow a non-stepwise movement of the 2D controller to change the boundary in a non-stepwise manner such as in a smooth gradual manner.

The relative movement between the 2D controller and superimposed model credibly assists the user to alter the visible area of the first zone and the second zone in a continued guided manner. As the first digital 3D dental model and the second digital 3D dental model are superimposed with corresponding regions overlaid on each other, the relative movement ensure that the user may gradually and selectively render not only the first 3D dental model or the second 3D dental model but do so such that corresponding region-specific rendering occurs. This allows for region-specific assessment in development of dental condition, thus leading to optimal dental treatment planning.

According to an embodiment, the method further includes moving the superimposed model to a location in the digital 3D space relative to the 2D controller placed at a position, and maintaining the 2D controller at the position during the movement of the superimposed model to the location and/or after the movement of the superimposed model to the location until a subsequent user input to move the superimposed model to a subsequent location or to move the 2D controller to a subsequent position is provided. The movement of the superimposed model in the 3D space may be along and/or around the six degrees of freedom, as described earlier. This may be achieved in response to a user input.

According to an embodiment, maintaining the 2D controller at the position during or after the movement of the superimposed model to the location includes applying a transformation matrix only to the superimposed model in response to the user input, the transformation matrix corresponding to the movement of the superimposed model to the location in the digital 3D space. Prior to applying the transformation matrix only to the superimposed model, the method may include identifying the superimposed model and 2D controller as distinct objects in the 3D space. Additionally or alternatively, maintaining the 2D controller at the position during or after the movement of the superimposed model to the location includes preventing application of a transformation matrix to the 2D controller, the transformation matrix corresponding to the movement of the superimposed model to the location in the digital 3D space in response to the user input. Prior to preventing application of the transformation matrix to the 2D controller, the method may include identifying the superimposed model and 2D controller as distinct objects in the 3D space.

According to an embodiment, maintaining the 2D controller at the position during or after the movement of the superimposed model to the location includes applying an inverse transformation matrix to the 2D controller, the inverse transformation matrix being an inverse of a transformation matrix that corresponds to the movement of the superimposed model in the digital 3D space in response to the user input. The superimposed model and the 2D controller are rendered in the same 3D space. Thus, the user input associated with the relative movement may also move the 2D controller. The relative movement is defined by the transformation matrix that corresponds to a camera position matrix that may represent a change in camera positions, where each position corresponds to camera view from two positions of the camera, e.g. a pre-movement position and post-movement position. In order for the 2D controller to be maintained at the position (e.g. maintaining the 2D controller stationary such as in a vertical orientation on a display from user perspective) during or after the movement of the superimposed model to the location, an additional transformation operation is applied to the 2D controller. This additional transformation operation is represented by a transformation matrix such as a linear transformation matrix. This additional transformation matrix is calculated as an inverse matrix of the camera position matrix that defines where the camera (e.g. point of view) is positioned within the 3D space, as described earlier. The camera position matrix is determined based on user interaction with the superimposed model in the 3D space such as move/rotate/zoom the superimposed 3D model etc. This means that the inverse transformation matrix is configured to place the 2D controller back to the previous/default position defined by the position prior to the user input corresponding to the movement of the superimposed model is received, thus the 2D controller remains static and maintained at its position while the user may freely moves/rotates/zooms the superimposed model in the 3D space.

According to an embodiment, the method further includes moving the 2D controller to a position in the digital 3D space relative to the superimposed model placed at a location, and maintaining the superimposed model at the location during the movement of the 2D controller to the position and/or after the movement of the 2D controller to the position until a subsequent user input to move the 2D controller to a subsequent position or to move the superimposed model to a subsequent location is provided. The movement of the 2D controller in the 3D space may be along and/or around the six degrees of freedom, as described earlier. This may be achieved in response to a user input.

According to an embodiment, maintaining the superimposed model at the location during or after the movement of the 2D controller to the position includes applying a transformation matrix only to the 2D controller in response to the user input, the transformation matrix corresponding to the movement of the 2D controller to the position in the digital 3D space. Prior to applying the transformation matrix only to the 2D controller, the method may include identifying the superimposed model and 2D controller as distinct objects in the 3D space. Additionally or alternatively, maintaining the superimposed model at the location during or after the movement of the 2D controller to the position includes preventing application of a transformation matrix to the superimposed model, the transformation matrix corresponding to the movement of the 2D controller to the position in the digital 3D space in response to the user input. Prior to preventing application of the transformation matrix to the superimposed model, the method may include identifying the superimposed model and 2D controller as distinct objects in the 3D space.

According to an embodiment, maintaining the superimposed model at the location during or after the movement of the 2D controller to the position includes applying an inverse transformation matrix to the superimposed model, the inverse transformation matrix being an inverse of a transformation matrix that corresponds to the movement of the 2D controller in the digital 3D space in response to the user input. The superimposed model and the 2D controller are rendered in the same 3D space. Thus, the user input associated with the movement of the 2D controller may also move the superimposed model. The relative movement is defined by a transformation matrix that corresponds to a camera position matrix that may represent a change in camera positions, where each position corresponds to camera view from two positions of the camera, e.g. a pre-movement position and post-movement position. In order for the superimposed model to be maintained at the location (e.g. maintaining the superimposed model stationary) during or after the movement of the 2D controller to the position, an additional transformation operation is applied to the superimposed model. This additional transformation operation is represented by a transformation matrix such as a linear transformation matrix. This additional transformation matrix is calculated as an inverse matrix of the camera position matrix that defines where the camera (e.g. point of view) is positioned within the 3D space, as described earlier. The camera position matrix is determined based on user interaction with the 2D controller in the 3D space such as move/rotate the 2D controller etc. This means that the inverse transformation matrix is configured to put the superimposed model back to the previous/default position defined by the location prior to the user input corresponding to the movement of the 2D controller is received, thus the superimposed model remains static and maintained at its location while the user may freely moves/rotates the 2D controller in the 3D space.

According to an embodiment, defining the boundary that demarcates the superimposed model includes moving, in response to a user input, at least one of the 2D controller to a position selected from a plurality of positions or the superimposed model to a location in the digital 3D space, and defining the boundary based on the relative arrangement (e.g. relative spatial relation) between the 2D controller and superimposed model in the digital 3D space during or after the movement of the at least one of the 2D controller or superimposed model.

In an embodiment, the plurality of positions includes a plurality of discrete separated positions that are configured to allow stepwise movement of the 2D controller to change the boundary in a stepwise manner. This stepwise movement may be defined by at least one of translation distance or rotational angle within the 3D space. In another embodiment, the plurality of positions comprises a plurality of continuous adjacent positions that are configured to allow non-stepwise movement of the 2D controller to change the boundary in a non-stepwise manner such as in a smooth gradual manner.

The plurality of position may be defined between a first extreme point and a second extreme point. In an embodiment, the plurality of positions comprises the first extreme position such that positioning the 2D controller at the first extreme position is configured to render only the first zone comprising the first digital 3D dental model in full without displaying the second digital 3D dental model. In another embodiment, the plurality of positions comprises the second extreme position such that positioning the 2D controller at the second extreme position is configured to render only the second zone comprising the second digital 3D dental model in full without displaying the first digital 3D dental model.

The relative movement between the 2D controller and superimposed model may be configured to produce a transition comprising simultaneously changing rendering of the at least a part of the first digital 3D dental model in the first zone and of the at least a part of the second digital 3D dental model in the second zone. The transition includes visual transition between corresponding regions of the first digital 3D dental model and second digital 3D dental model on either side of the boundary. In an embodiment, the relative movement between the 2D controller and superimposed model is configured to produce a transition comprising increasing rendering of the at least a part of the first digital 3D dental model in the first zone while simultaneously decreasing rendering of the at least a part of the second digital 3D dental model in the second zone, or vice versa.

The transition includes visual transition between corresponding regions of the first digital 3D dental model and second digital 3D dental model on either side of the boundary. The corresponding regions typically include at least one of clinically corresponding regions or anatomically corresponding regions.

In an embodiment, the relative movement between the superimposed model and the 2D controller is configured to display a region of interest from one of the first digital 3D dental model or second digital 3D dental model that is being revealed from the superimposed model while simultaneously hiding corresponding region of interest from another of the first digital 3D dental model or second digital 3D dental model that is being hidden from the superimposed model. The region of interest may include corresponding regions from the first digital 3D dental model and second digital 3D dental model. According to an embodiment, revealing includes selectively enabling rendering of one of the first digital 3D dental model or second digital 3D dental model, and hiding comprises simultaneously disabling rendering of the another of the first digital 3D dental model or second digital 3D dental model. According to another embodiment, revealing one of the first digital 3D dental model or second digital 3D dental model comprises increasing the transparency of the revealed model; and hiding another of the first digital 3D dental model or second digital 3D dental model comprises decreasing the transparency of the revealed model.

In one embodiment, rendering in the first zone comprises generating a part of the first digital 3D model and disabling generation of a part of the second digital 3D model from the first zone, and rendering in the second zone comprises generating a part of the second digital 3D model and disabling generation of a part of the first digital 3D model from the second zone.

In one embodiment, the rendering includes identifying the at least a part of the first digital 3D model from the superimposed model located in the first zone and identifying the at least a part of the second digital 3D model from the superimposed model located in the second zone; and generating only the identified at least a part of the first digital 3D dental model from the superimposed model in the first zone and only the identified at least a part of the second digital 3D dental model from the superimposed model in the second zone. As the superimposed model comprises both the first digital 3D dental model and second digital 3D dental model, generating may include either rendering one model in one zone and/or preventing rendering of another model in another zone. Additionally, prior to identifying model location in a specific zone (first zone or second zone), the method may include determining or assigning the first zone and the second zone. These zones are generally determined or assigned on either side of the 2D controller.

According to an embodiment, the 2D controller includes a surface comprising a first face and second face opposite to the first face. Accordingly, identifying the at least a part of the first digital 3D model from the superimposed model located in the first zone and identifying the at least a part of the second digital 3D model from the superimposed model located in the second zone includes identifying a portion of the superimposed model lying on one side of the surface of the 2D controller as one of the first zone or the second zone; and identifying another portion of the superimposed model lying on another side of the surface of the 2D controller as another of the second zone or the first zone. In an embodiment, the identification of each zone is performed by individually applying identification rule on at least side of the 2D surface.

According to an embodiment, identifying the portion of the superimposed model lying on a side, i.e. identification rule, comprises directing a set of plurality of vectors in a predefined direction away from a face of the surface of the 2D controller; and identifying a portion of the superimposed model intersecting with the set of the plurality of vectors as the portion of the superimposed model lying on the one or another side of the surface.

According to an embodiment, identifying the portion of the superimposed model lying on the one side, i.e. the identification rule, includes directing a first set of plurality of vectors in a predefined direction away from the first face of the surface of the 2D controller, and identifying the portion of the superimposed model intersecting with the first set of the plurality of vectors as the portion of the superimposed model lying on the one side, i.e. corresponding to one zone. The first set of plurality of vectors may include normal vectors from different points lying on the one side, i.e. in orthogonal direction which may include normal direction for a planar 2D controller surface and radial direction for a curved 2D controller surface. In an embodiment, the identification of each zone is performed by individually applying identification rule on at least side of the 2D surface.

According to an embodiment, identifying the portion of the superimposed model lying on the another side, i.e. the identification rule, includes directing a second set of plurality of vectors in a predefined direction away from the second face of the surface of the 2D controller; and identifying the portion of the superimposed model intersecting with the second set of the plurality of vectors as the portion of the superimposed model lying on the another side, i.e. corresponding to another zone. The predefined direction away from the second face is typically in opposite direction to the predefined direction away from the first face. The second set of plurality of vectors may include normal vectors from different points lying on the another side, i.e. orthogonal direction which may include normal direction for a planar 2D controller surface and radial direction for a curved 2D controller surface. In an embodiment, the identification of each zone is performed by individually applying identification rule on at least side of the 2D surface.

The method may include identifying the at least a part of the one digital 3D dental model (e.g. first digital 3D dental model or second digital 3D dental model) from the superimposed model in its respective zone (e.g. first zone or second zone). Thus, identifying comprises identify the at least a part of the first digital 3D model from the superimposed model located in the first zone and identifying the at least a part of the second digital 3D model from the superimposed model located in the second zone. This may facilitate for rendering the identified at least a part of the one digital 3D dental model in the respective zone.

According to an embodiment, the method includes determining one vector in a predefined direction from a point on the surface of the 2D controller and a model vector comprising a vector from a point on the surface of the 2D controller to a model point of one of the first digital 3D dental model or second digital 3D dental model. An output such as a dot product is determined based on an operation such as dot product applied on the determined one vector and the model vector and a determination is made whether the model point of one of the first digital 3D dental model or second digital 3D dental model is located in the first zone or second zone based on the output. The determination is based on whether the output satisfies a criterion, e.g. rendering criterion Based on the determination, the zone for the location of the model point is identified.

In an embodiment, the method comprises determining a vector in a predefined direction from a point on a face (e.g. first face) of surface of the 2D controller and a model vector comprising a vector from a point to a model point of a digital 3D dental model (e.g. second face), determining an output based on an operation applied on the determined one vector and the model vector, and identifying the at least a part of the digital 3D dental model (e.g. first digital 3D dental model) from the superimposed model located in the first zone if the output satisfies a rendering criterion. For example, if the rendering criterion is satisfied then the model point is determined to be along the predefined direction, i.e. on the same side of the surface of the 2D controller. Alternatively, if the rendering criterion is not satisfied, i.e. the output fails to satisfy, then the model point is determined to be in opposite direction to the predefined direction, i.e. on the another side of the surface of the 2D controller. The method may further include performing the aforementioned steps for a plurality of vector pairs, each comprising vector in a predefined direction and model vector. Thus, the method further includes repeatedly performing the stated operation with same or different vector in a predefined direction and different model vector pair to identify the at least a part of the one digital 3D dental model (e.g. first digital 3D dental model) from the superimposed model in its respective zone (e.g. first zone).

The point on the surface from which the vector in the predefined direction and the model vector is determined may be same or different. The predefined direction may represent a direction orthogonal to the surface of the 2D controller, i.e. the vector represents a normal vector. The orthogonal direction may include normal direction for a planar 2D controller surface and radial direction for a curved 2D controller surface. The model point may include a point on the first digital 3D dental model such a vertex of the mesh forming the model, a point on the mesh including the edge point, or any model surface point. The operation may include a mathematical operation such as dot product between each of the vector and model vector pair. The criterion may include the output of dot product being positive to indicate that the model point is in the predefined direction associated with the vector, i.e. in the direction of the first face when the predetermined direction is in the direction of the first face. Alternatively, the criterion may include the output of dot product being negative to indicate that the model point is in a direction opposite to the predefined direction associated with the vector, i.e. in a direction opposite to the first face, thus in the direction of the second face, when the predetermined direction is in the direction of the first face.

In an embodiment, the identification includes determining a vector in a predefined direction from a point on the first face of surface of the 2D controller and a model vector comprising a vector from the point to a model point of the first digital 3D model, determining an output based on an operation applied on the determined one vector and the model vector, and identifying the at least a part of the first digital 3D model from the superimposed model located in the second zone if the output fails to satisfy a rendering criterion.

In an embodiment, the 2D controller comprising a surface that demarcates the superimposed dental model by dividing the superimposed model into two zones. One section of the first digital 3D dental model may be rendered on one side of the 2D controller surface as the first zone of the superimposed model while a section of the second digital 3D dental model is rendered on the other side of the 2D controller surface as the second zone of the superimposed model. This may be achieved by applying a rendering operation. The rendering operation may include evaluating a dot product between a normal vector and a model vector and determining whether a vertex of the first digital 3D model is located left or right of the 2D controller surface based on the output of the dot product. This includes calculating a dot product of the 2D controller normal vector ($\vec{n}$) from a point on the 2D controller surface and a model vector ($\vec{a}$) pointing from the point on the 2D controller surface to the vertex in a mesh representation of the first 3D dental model. The point of the 2D controller surface from which the normal is drawn and the 2D controller surface from which the model vector is drawn may be same or different. In any event, if the dot product (i.e. rendering criterion) of vector $\vec{a}$ and $\vec{n}$ is ≥0 then the tested vertex determined to be located on the same side as the direction of the normal vector. However, if the dot product (i.e. rendering criterion) of $\vec{a}$ and $\vec{n}$ is <0, then the tested vertex is determined to be located on the other side of the 2D controller surface, i.e. opposite side to the direction of the normal vector. In order to determine which side of the 2D controller a vertex of a model lies, the rendering criteria may be applied to different vertices of the model. This vertex test calculation may be performed by a shader (e.g. DirectX shader), which is configured to determine whether a digital 3D dental models (307, 309) needs to be rendered in a specific zone or not and render the at least part of the digital 3D dental models (307, 309) in respective zone. For example, this may result in the first digital 3D dental model getting clipped in the second zone and is thus rendered in the first zone. Same rendering operation may be applied for the second digital 3D model, just the calculation is made for the opposite side of the 2D controller surface, such that the dot product between the normal vector ($\vec{n}$) and each vertex vector ($\vec{a}$) is negative in order to be rendered in the 3D space in the second zone.

According to an embodiment, the method includes rendering only the at least a part of the first digital 3D dental model from the superimposed model in the first zone and only the at least a part of the second digital 3D dental model from the superimposed model in the second zone. The rendering includes clipping a portion of the first digital 3D dental model overlapping with the second digital 3D dental model from the second zone, the clipped portion defining a hidden part of the first digital 3D dental model from the second zone. Additionally, rendering includes clipping a portion of the second digital 3D dental model overlapping with the first digital 3D dental model from the first zone, the clipped portion defining the hidden part of the second digital 3D dental model from the first zone. The term "hidden" may be understood as preventing rendering or increasing transparency such that the hidden part is with reduced or no visibility on the display.

In an embodiment, the 2D controller includes a surface such as a planar surface that is configured to slide across a plurality of positions. The surface of the 2D controller typically extends in a direction such that a line comprising the plurality of positions or a plane comprising the plurality of positions is at least substantially orthogonal to the surface of the 2D controller. This may be understood as a surface of the 2D controller that extends in a direction that is at least substantially orthogonal to the display screen, thus the user may visually perceive the surface of the 2D controller as a line or a curve.

In an embodiment, the method includes rendering at least a part of a digital 3D dental model comprising disjoint parts of one of the first digital 3D model in the first zone or the second digital 3D model in the second zone in response to a user input corresponding to relative movement between the 2D controller and superimposed model, wherein the disjoint parts are separated by at least a part, connecting the disjoint parts, of another of the second digital 3D model in the second zone or first digital 3D model in the first zone.

According to an embodiment, a data processing system is disclosed. The data processing system includes modules or computation units such as a hardware processor that are configured to perform one or more steps of the method disclosed in one or more embodiments of this disclosure. The data processing system may include other modules such as memory.

According to an embodiment, a computer program product embodied in a non-transitory computer readable medium is disclosed. The computer program product includes computer readable program code being executable by a hardware data processor to cause the hardware data processor to perform a method when said computer readable program code is executed by the hardware data processor. The method may include one or more functions that allow one or more system components to perform one or more steps of the method disclosed in one or more embodiments of this disclosure.

BRIEF DESCRIPTION OF THE DRAWINGS

The embodiments of the disclosure, together with its advantages, may be best understood from the following illustrative and non-limiting detailed description taken in conjunction with the accompanying figures in which

FIG. 3A illustrates a 2D controller demarcating a first zone and a second zone of the superimposed model according to an embodiment;

DETAILED DESCRIPTION

Figure 1:
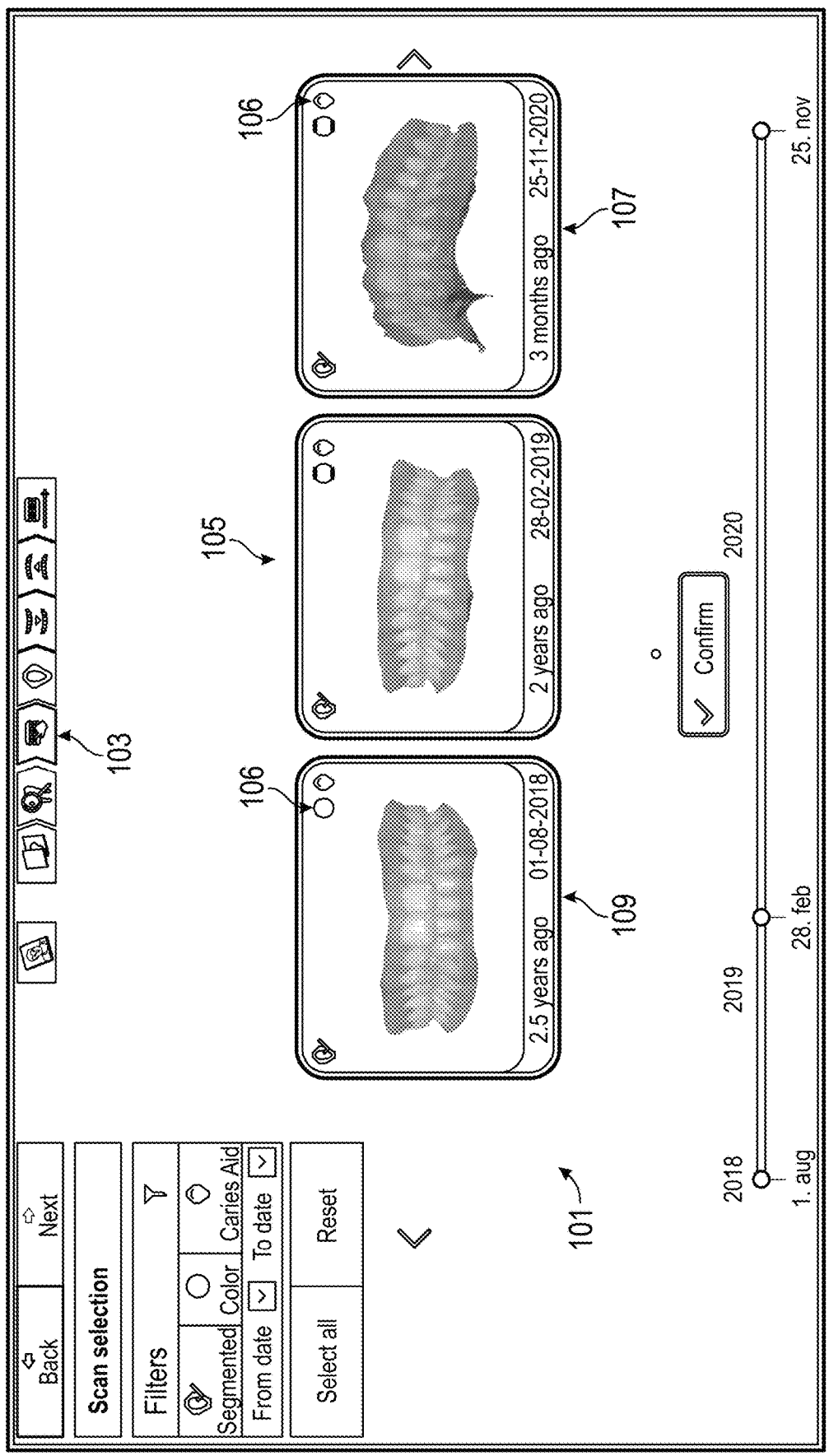
FIG. 1 illustrates a graphical user interface according to an embodiment.

In the following description, reference is made to the accompanying figures that show by way of illustration how the disclosed method be practised or system may be implemented.

Patients typically go through a routine dental checkup once a year or may be with shorter timer intervals. As part of such dental visits, patient may get scanned in a dental clinic such as using an intraoral scanner. Thus, scanning at these dental visits may generate one or more 3D data sets representing the dental situation of patient oral cavity at the timepoint of acquisition of the data set. These historical data sets may be utilized to monitor the development or change in the dental situation over time when these data sets are compared directly or indirectly to one another. In an example, instructions that, when executed by a computer, cause the computer to load, visualize and analyze difference(s) between dental information in the form of 3D data obtained from the same patient at different timepoints in a digital 3D space. Such data may be in the form of 3D topology data, additionally with one or more of color data, fluorescence data, Infra-red data or any other type of data associated with the 3D topology of the dental situation.

According to an embodiment, a computer readable medium is disclosed. The computer readable medium stores instructions that, when executed by a computer, cause the computer to perform a specified computer implemented method. The computer implemented method allows for rendering digital three-dimensional dental models of a patient. The method includes receiving, in a digital 3D space, a first digital 3D dental model comprising a first dental information of a patient;

receiving, in the digital 3D space, a second digital 3D dental model comprising a second dental information of the patient, the second dental information being at least partly different from the first dental information;

generating, in the digital 3D space, a superimposed model by superimposing one of the first digital 3D dental model or the second digital 3D dental model on another of the second digital 3D dental model or the first digital 3D dental model; and arranging, in the digital 3D space, a 2D controller and the superimposed model relative to each other such that a position of the 2D controller relative to a location of the superimposed model defines a boundary that demarcates the superimposed model between a first zone configured to render only at least a part of the first digital 3D dental model from the superimposed model and a second zone configured to render only least a part of the second digital 3D dental model from the superimposed model.

The disclosed computer readable medium stores instructions that, when executed by a computer, cause the computer to render a graphical user interface that is configured to load, visualize and analyze difference(s) between dental information in the form of 3D data obtained from the same patient at different timepoints in a digital 3D space.

FIG. 1 illustrates a graphical user interface 101 representing first step of the comparison software module 103 according to an embodiment. The graphical user interface presents the user with a list of the historical data 105 that is available for a specific patient. The data may include full 3D data representing both the upper and lower dental arch including the palate and some gingiva. Alternatively, the data may include a part of the full 3D data such as only a quadrant of the dental arch, only contain reflective color texture etc. In FIG. 1, the available digital 3D information is shown by a sequence of tiles representing the historical 3D data. Additional icon 106 within the tiles may indicate to the user what kind of data is available such as color data, fluorescence data, prep scan etc. The user may select two or more data sets for comparison by clicking on the respective tile. In the FIG. 1, the user may select two data sets for comparison, such that a first digital 3D dental model 107 comprising a first information of a patient is selected obtained at one point in time and a second digital 3D dental model 109 comprising second dental information of the same patient obtained on a second point in time are loaded into the comparison software module 103.

Figure 2A:
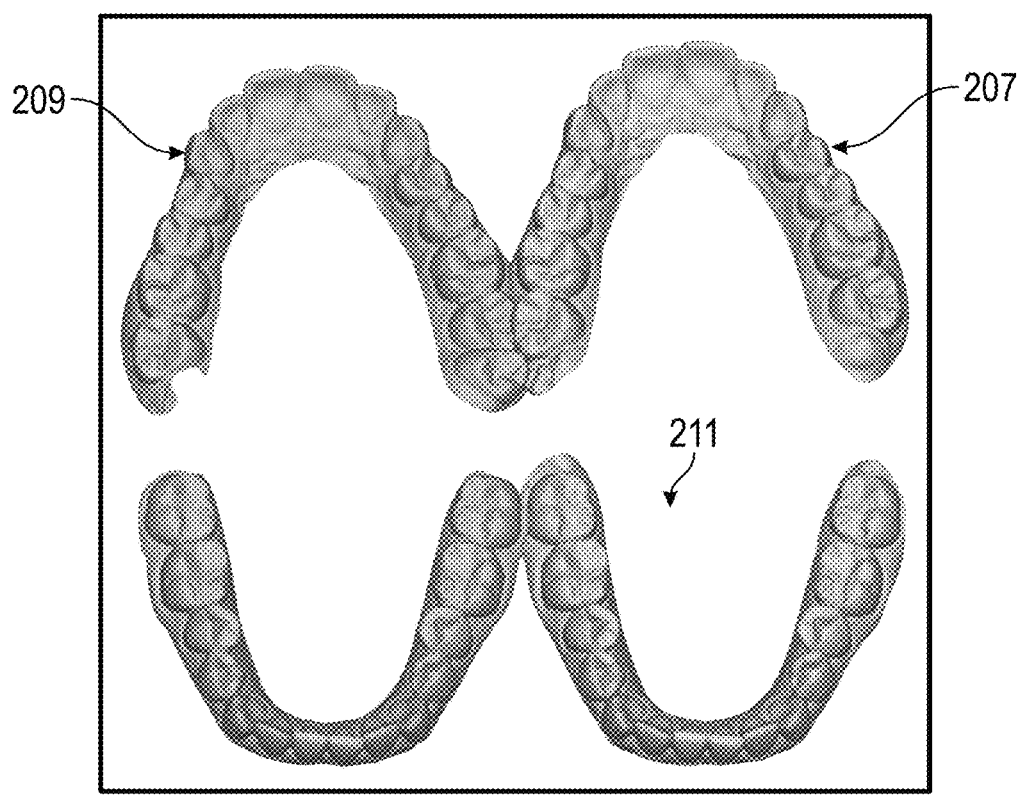
FIG. 2A illustrates an occlusion view of two digital 3D dental models according to an embodiment.
Figure 2B:
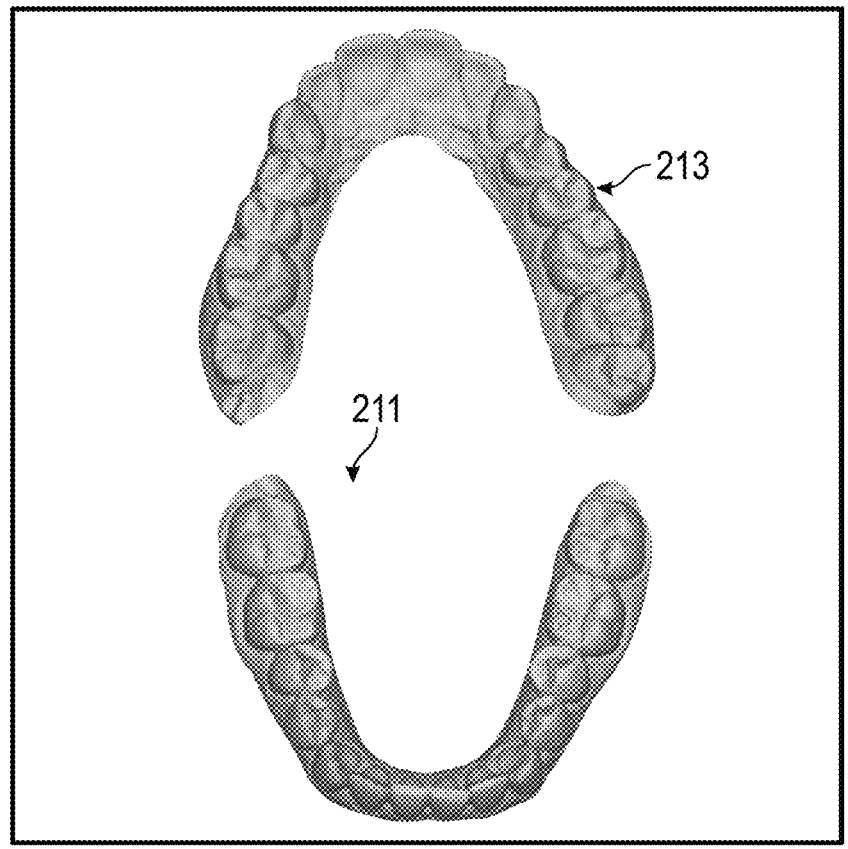
FIG. 2B illustrates a superimposed model based on superimposition of the two digital 3D dental models of FIG. 2A according to an embodiment.
Figure 2C:
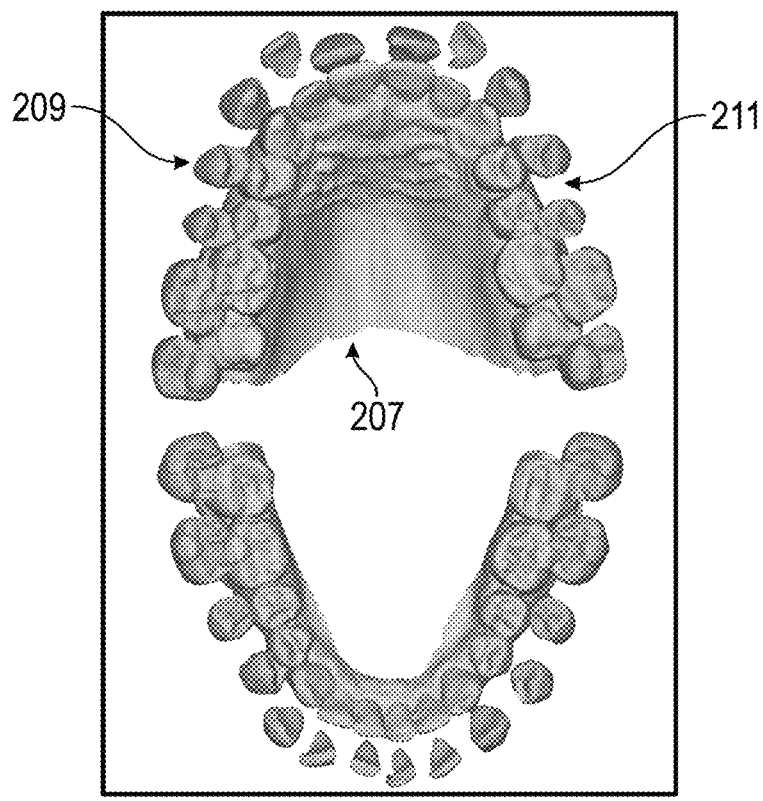
FIG. 2C illustrates two segmented 3D models according to an embodiment.
Figure 2D:
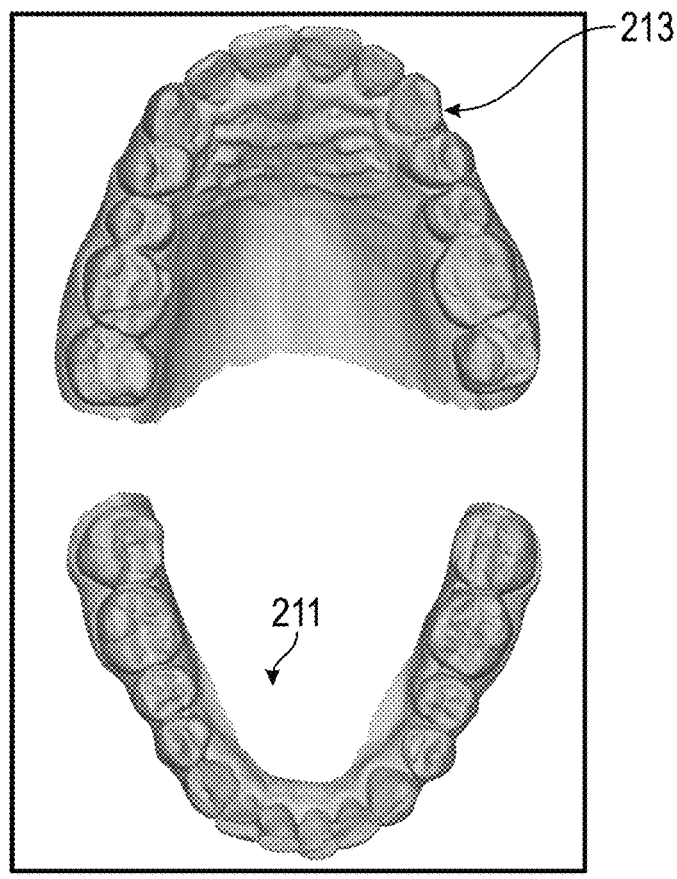
FIG. 2D illustrates superimposed 3D model based on superimposition of the two segmented models of FIG. 2C according to an embodiment.

FIGS. 2A and 2B illustrate different stages in the process of super imposing the digital 3D dental models (207, 209) in the digital 3D space 211. FIG. 2A illustrates occlusion view of two digital 3D dental models (207, 209) within the digital 3D space 211. FIG. 2B illustrates the two 3D models being arranged into a superimposed 3D model 213 which is created by alignment of the second digital 3D dental model 209 onto the first digital 3D model 207 such that the two 3D models are brought into a common coordinate system. The instructions when executed by the computer causes the computer to allow the user to manipulate the view of the superimposed 3D model such that the superimposed 3D model may be visualized from different perspectives. Additionally, the instructions when executed by the computer causes the computer to allow the user to adjust the information presented in the superimposed 3D model such as toggling off or making a part of the superimposed 3D model to allow rendering of partial information only, like toggling off lower jaw. This allows the user to focus on the rendered information such upper jaw only. Additionally, this allows more 3D space being available for portion of the superimpose model that is not toggled off, thereby optimally utilizing the 3D space for assessment purposes. In another scenario, the first and second 3D dental models (207, 209) are analyzed by a trained neural network which may segment the mesh into different dental components, such that individual teeth are recognized within the digital 3D dental models (207, 209). The segmented models allow for the superimposition of a part of one digital 3D dental model on top of another digital dental 3D model. Such example is illustrated by way of FIG. 2C and FIG. 2D. This illustrate a situation where only a sub part of the mesh associated with the teeth from the second digital 3D dental model 209 is superimposed on the first digital 3D dental model 207 to form the superimposed dental models 213 with in the 3D space 211.

The graphical user interface includes a 2D controller 315, which is configured to be positioned relative to the superimposed 3D model. The 2D controller allows for examining changes or differences between the first and second digital 3D models (207, 209). In an embodiment, as illustrated in FIG. 3A, the 2D planar controller 315 appears as a vertical line dividing the superimposed dental model 213 into two segments displaying only the first digital 3D dental model 307 of the superimposed dental models 213 on one side of the vertical line and only the second digital 3D dental model 309 of the superimposed dental models 213 on the other side of the vertical line. The 2D controller 315 thus creates a boundary within the 3D space 311 demarcating the superimposed model 213 into a first zone that is configured display only at least a part of the first digital 3D dental model 307 and a second zone that is configured to display only at least a part of the second digital 3D dental model 309. In any of the present embodiments, the 2D controller 315 may appear to the user as a line segment in any straight or curved form and/or orientation on the display, such as horizontal, diagonal, wave-shaped, circular or a combination thereof.

The superimposed model comprises the first zone and the second zone. Thus, term "zone" may be understood as part of the superimposed 3D model with the first zone comprising part of the superimposed 3D model where only at least a part of the first 3D model is rendered, and second zone comprising part of the superimposed 3D model where only at least a part of the second 3D model is rendered.

Figure 3B:
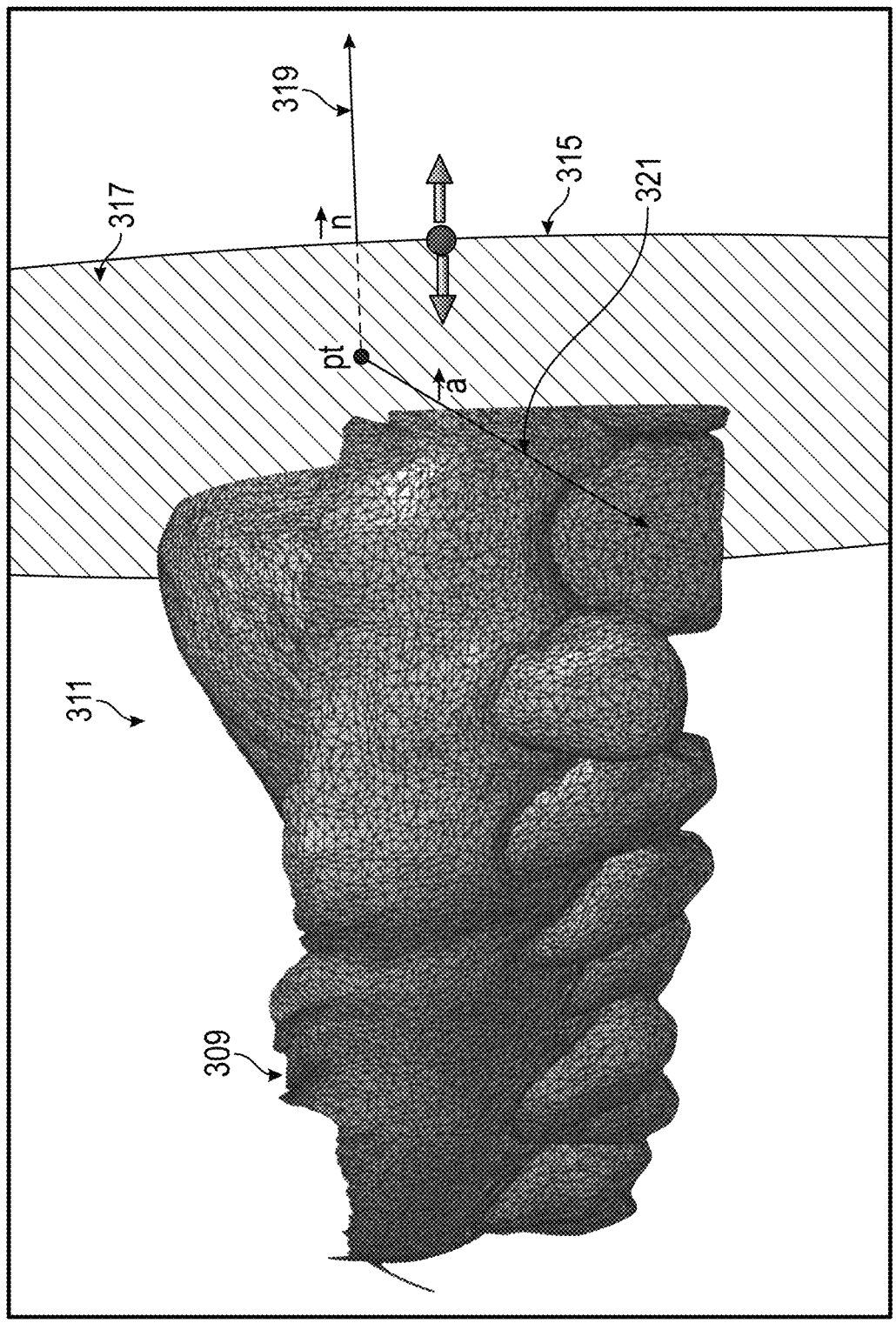
FIG. 3B illustrates a 2D controller comprising a clipping plane according to an embodiment.

In the embodiment, as illustrated in FIG. 3B, the 2D controller 315 is realized by defining a clipping plane 317 as part of the 3D space 311 within which the superimposed model 213 is also rendered. This means that that the clipping plane 317 may also be a subject of being manipulated in response to a user input that manipulates the 3D space. The manipulation is defined by a transformation matrix. The transformation matrix, i.e. camera position matrix, may represent a change in camera positions, where each position corresponds to camera view from pre-manipulation and post-manipulation positions of the camera. Such manipulation may include rotation, movement, zooming in/out when a user interacts with the digital 3D space 311. In order for the clipping plane 317 to remain in a predetermined orientation such as to be "vertical" on a display from user's view and be rendered as a vertical line to the user from the screen view point as shown in FIG. 3A, an additional transformation operation is applied to the clipping plane 317. This additional transformation operation is represented by a transformation matrix such as a linear transformation matrix. This additional transformation matrix is calculated as an inverse matrix of the camera position matrix that defines where the camera (e.g. point of view) is positioned within the 3D space, as described earlier. The camera position matrix is determined based on user interaction with the superimposed dental models 213 in the 3D space 211 such as move/rotate/zoom the superimposed 3D model etc. This means that the inverse transformation matrix will put the 2D controller back to the previous/default position, thus the clipping plain 317 remains static while the user may freely moves/rotates/zooms the superimposed dental models 213 in the 3D space 311.

As seen from FIG. 3B, the clipping plane 317 demarcates the superimposed dental models 213 by dividing the superimposed model into two zones. One section of the first digital 3D dental model 307 may be displayed on one side such as the right-hand side of the clipping plane 317 as the first zone of the superimposed model while a section of the second digital 3D dental model 309 is displayed on the other side such as left-hand side of the clipping plane 317 as the second zone of the superimposed model. This may be achieved by applying a rendering operation. The rendering criteria comprises evaluating a dot product between a normal vector and a model vector and determining whether a vertex of the first digital 3D model 307 is located left or right of the clipping plane 317 based on the dot product. This includes calculating a dot product of the clipping plane's normal vector ($\vec{n}$) 319 from a point on the clipping plane and a model vector ($\vec{a}$) 321 pointing from the point on the clipping plane 317 point to the vertex in the mesh representation of the first 3D dental model 307. The clipping plane point from which the normal is drawn and the clipping plane from which the model vector is drawn may be same or different. In any event, if the dot product (i.e. rendering criterion) of vector $\vec{a}$ and $\vec{n}$ is ≥0 then the tested vertex positioned is on the same side as the direction of the normal vector. However, if the dot product (i.e. rendering criterion) of $\vec{a}$ and $\vec{n}$ is <0, then the tested vertex is located on the other side of the clipping plane 317. The latter is illustrated in FIG. 3B where the dot product of $\vec{a}$ and $\vec{n}$ is negative, thus indicating that the vertex is on a side opposite to where the normal vector is pointing. In order to determine which side of the 2D controller a vertex of a model lies, the rendering criteria may be applied to different vertices of the model. This vertex test calculation may be performed by a shader (e.g. DirectX shader), which is configured to determine whether a digital 3D dental models (307, 309) needs to be rendered in a specific zone or not and render the at least part of the digital 3D dental models (307, 309) in respective zone. For example, this results in the first digital 3D dental model (307) getting clipped in the second zone and is thus rendered in the first zone (not shown). Same rendering operation may be applied for the second digital 3D model 309, just the calculation is made for the opposite side of the clipping plane, such that the dot product between the normal vector ($\vec{n}$) 319 and each vertex vector ($\vec{a}$) 321 is negative in order to be rendered in the 3D space 311 in the second zone, i.e. on the left-hand side of the clipping plane 317 as shown.

Figure 3C:
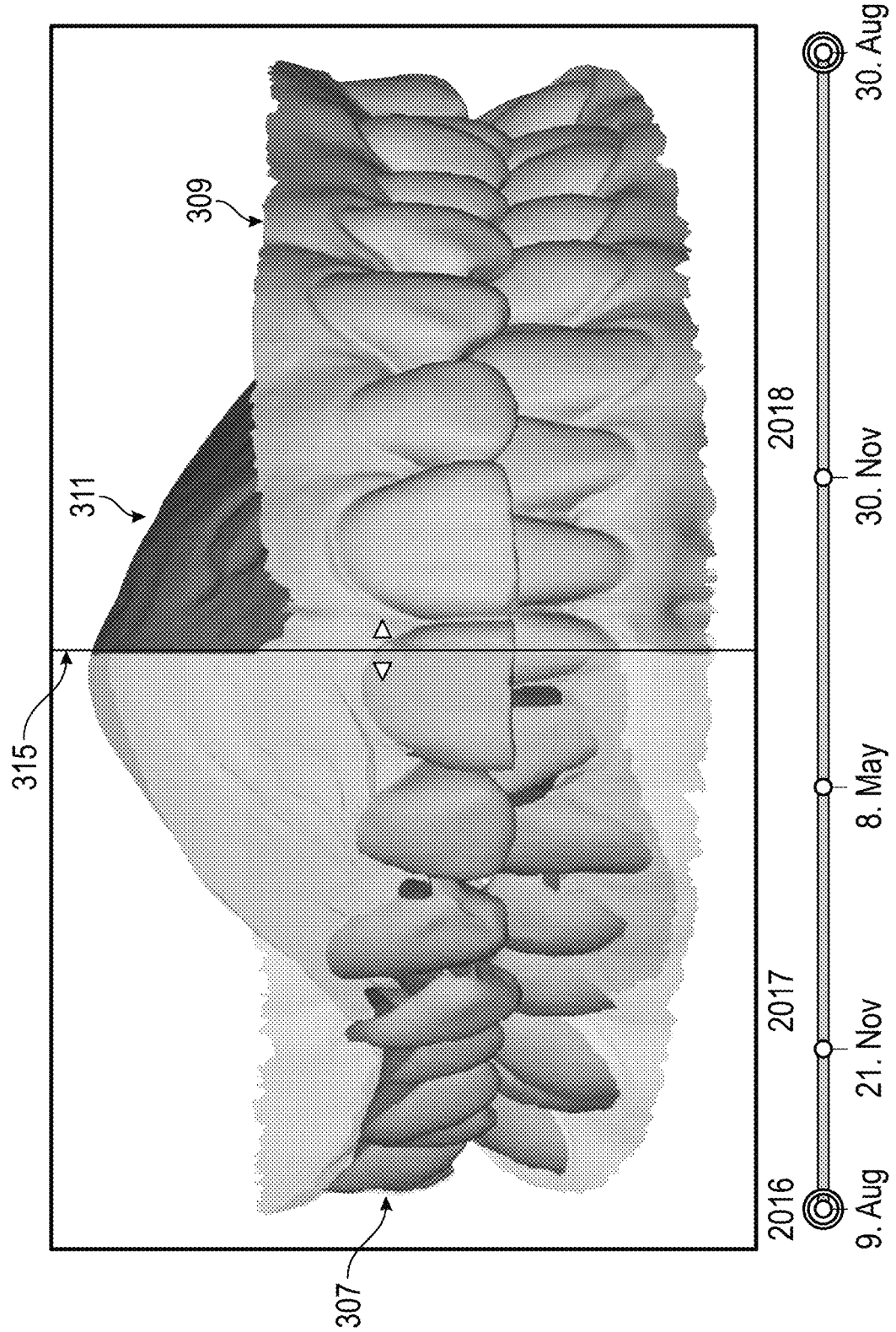
FIG. 3C illustrates a superimposed 3D model in relation to the 2D controller according to an embodiment.

FIG. 3C illustrates a superimposed 3D model in relation to the 2D controller according to an embodiment. The illustrated superimposed 3D model shows a jaw in a bite view, wherein the superimposed 3D model comprises superimposition of only the teeth of the first digital 3D dental model 307 onto the second 3D dental model 309. The 2D controller is displayed as a vertical line creating a boundary such that only the second 3D dental model 309 is rendered on the one side (e.g. right hand side) of the line but a combination of the first and the second 3D dental model is rendered on the other side (e.g. left hand side). Prior to superimposing the first and the second dental models (307, 309) one or both of the models may be subjected to a segmentation module capable of identifying and classifying the different dental objects of the model in different categories like tooth or gingiva. This may be performed by identifying vertices in the mesh to be falling in a certain category such that at least individual teeth and gingiva. The segmentation may be realized using a manual approach or automated using curvature analysis or machine learning/neural networks. In another embodiment, the superimposed 3D model includes at least one segmented digital 3D model superimposed onto the other digital 3D model. The segmentation allows the user to control visualization of a specific dental object or dental objects from a selected category. For example, gingiva part belonging to the segmented first digital 3D dental model 307 might be clearly transparent or grayed out either automatically or based on a user input, such that only the differences in the gingiva area is disregarded in relation to relative movement between the 2D controller 315 and superimposed model and only the changes in the teeth between the first digital 3D model and the second digital 3D model are visible. This approach may be beneficial when examine a specific tooth.

In several embodiments, the spatial relation of 2D controller (e.g. FIG. 3, 315) with respect to the superimposed model in the 3D space (e.g. FIG. 3, 311) may be manipulated by the user, such as by dragging either in a first direction or in a direction opposite to the first direction (e.g. left or to the right) on the screen. By changing the position of the 2D controller, the boundaries between the two digital 3D dental modes (e.g. FIG. 3, 307, 309) are manipulated such that a change in visible portion of the first and second models occur. For example, dragging the 2D controller may make a bigger portion of one model visible while simultaneously reducing the portion of the other model becoming visible.

Figure 4A:
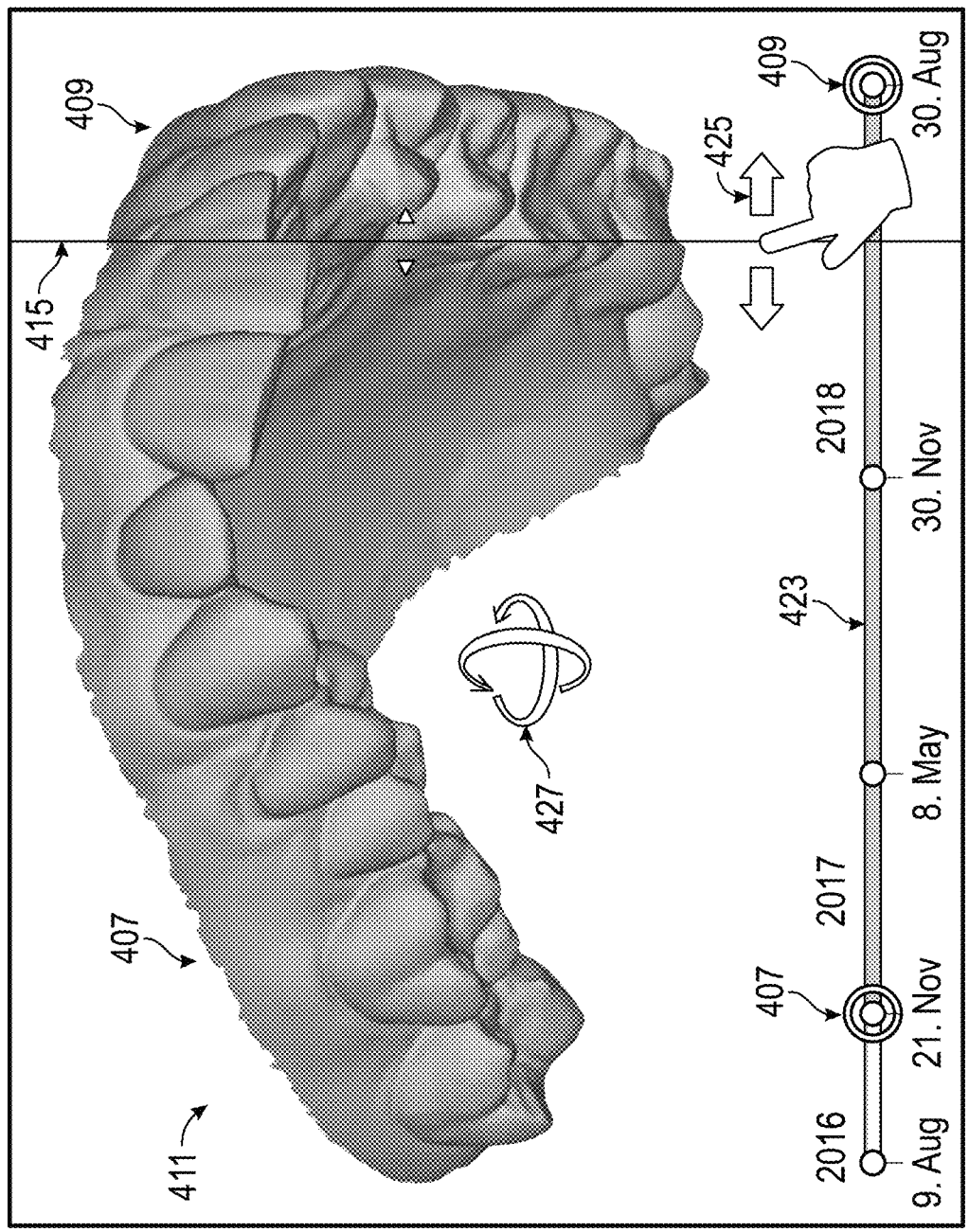
FIG. 4A illustrates user input for producing relative movement according to an embodiment.

FIG. 4A illustrates user input for producing relative movement according to an embodiment. The embodiment discloses a user interface where a plurality of historical data sets (e.g. five) corresponding to the digital 3D models from different time points are loaded into the software module as depicted on a virtual timeline 423 by circles (e.g. 407) in the bottom of the view. A first and second digital 3D dental model 407, 409 are user selected for comparison and represent the first digital 3D dental model and second digital 3D dental model as indicated on the timeline 423 by a secondary circle and also displayed in the 3D space. Additionally to the display of secondary cycles indicating the selected first— and second digital dental models 407, 409, specific color coating or shading may be applied to the timeline 423 and/or indicators to easily communicate to the user which data points are chosen as the first- and second digital 3D dental models 407,409. The 2D controller 415 is pulled slightly to the right by providing a direct user input 425 while the superimposed 3D dental model 213 is additionally rotated with in the 3D space by a second user interaction 427, which corresponds to multiple degrees of freedom. The interactions with the superimposed 3D model 213 may be performed completely independent of the manipulation of the 2D virtual controller 415.

Figure 4B:
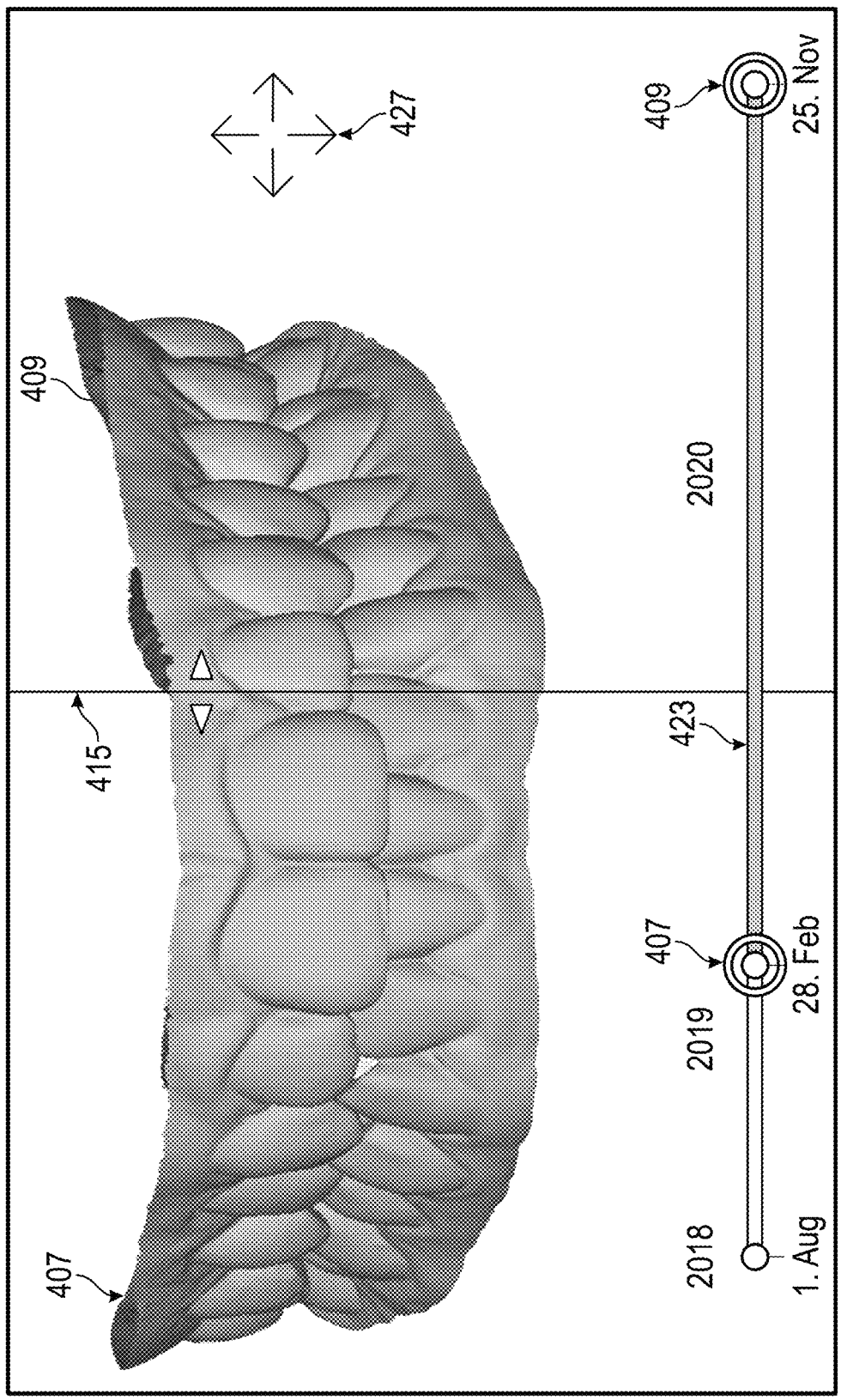
FIG. 4B illustrates movement of the superimposed model according to an embodiment.

FIG. 4B illustrates movement of the superimposed model according to an embodiment. The 2D controller 415 is stationary at a position while the superimposed 3D model 213 is panned across the 3D space 211 based on the direct user input using the interface 427 without affecting the position of the 2D controller 415, i.e. the 2D controller is maintained at its stationary position during the movement of the superimposed model.

Figure 4C:
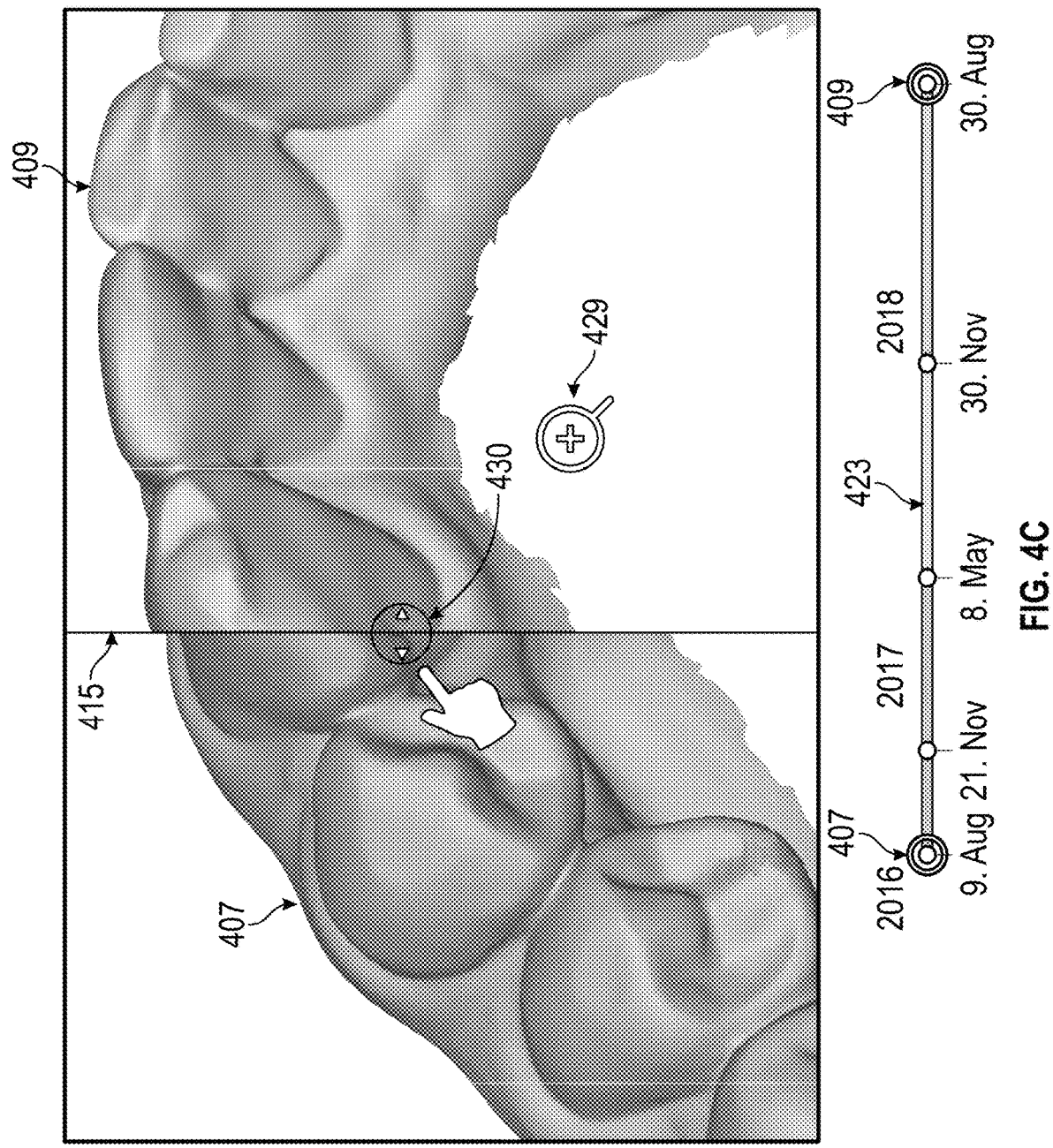
FIG. 4C illustrates movement of the superimposed model according to an embodiment.

FIG. 4C illustrates movement of the superimposed model according to an embodiment. The upper jaws of the superimposed 3D model 213 is toggled off and the model is zoomed to display a specific region of the superimposed model by a direct user input using interface 429 while a 2D tool may be used to examine specific region of a specific tooth by sliding the 2D controller 415 back and forth. In an embodiment relating to zooming in, i.e. increasing magnification, the method includes avoiding applying the inverse of a transformation matrix on the 2D controller, where the transformation matrix corresponds to the zooming in of the superimposed model.

In an embodiment, to increase the usability of the 2D controller 415, the slider may become active, such that it may respond to user input for manipulating its position when the cursor is within a close proximity of slider plane. Then the 3D controller 415 becomes activated. The activation may result in the 2D controller 415 (become slightly enlarged or an assistive feature 430 may appear on the 2D controller 415 such that it may become easier for the user to manipulate position of the 2D controller. This may be advantageous on a touch screen interface, then the 2D controller 415 may receive position input from a finger which is relative larger than a traditional screen courser.

As the 3D space 411 is interactive while the 2D controller 415 is functional, similar behavior may be obtained by moving the position of the superimposed 3D model 213 within the 3D space 411 relative to the 2D controller 415. Additionally, the superimposed model 213 may be rotated, panned and zoomed within the 3D space 411 while the 2D controller 411 is maintained stationary at a given position unaffected by the translations or rotations performed on the superimposed model in the 3D space 411.

The 2D controller 415 may include a tool for examining changes at a specific point of interest (e.g. corresponding regions) on the first or second digital 3D dental models 407, 409. By zooming and rotating the superimposed 3D model 213 to a location the region of interest in the center of the 3D space display view the user may visualize specific changes by manually moving the 2D controller 415 back and forth in an alternatively manner across the region of interest, thereby dynamically transitioning between the first and the second digital 3D dental model 407, 409 in that specific region, thus enabling a comparison and more accurate examination of even small changes between the first and the second digital 3D dental models 407, 409.

Figure 5:
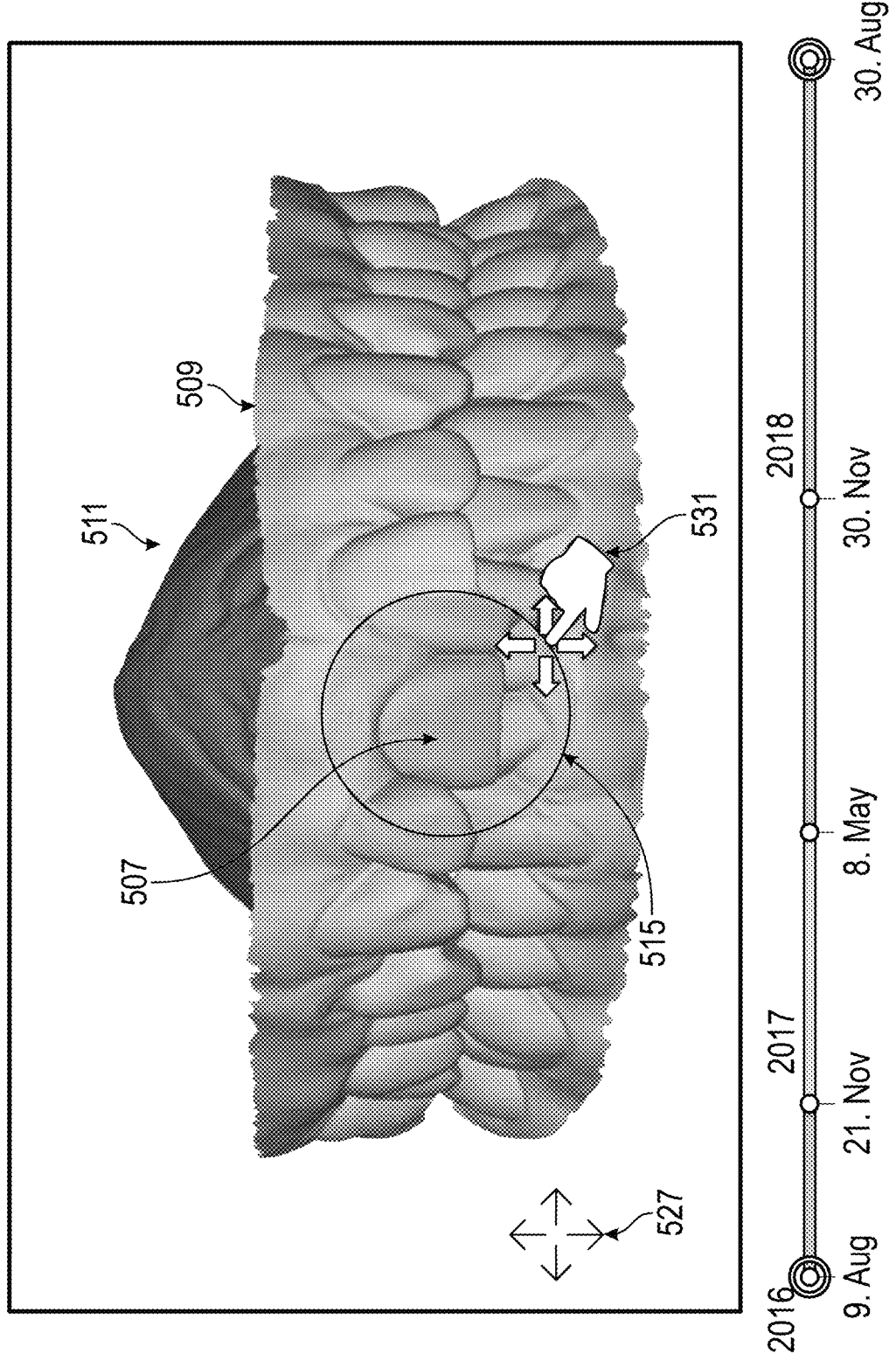
FIG. 5 illustrates a 2D controller according to an embodiment.

FIG. 5 illustrates a 2D controller according to an embodiment. The 2D controller 515 is movable in the 3D space and may be used to identify changes or differences between the first and second digital 3D models (207, 209). The 2D controller is defined by a closed shape, such as a closed circular 2D controller, that is configured to define a boundary demarcating the superimposed model into a first zone such as within the closed shape and a second zone such as outside the closed shape. The zone within the closed shape is configured to display only the first digital 3D dental model 507 of the superimposed dental model 213 i.e. inside the circle and only the second digital 3D dental model 509 of the superimposed dental model 213 outside of the 2D controller 515. The user may be able to switch the models around, if it is preferred to visualize the second digital 3D dental model 509 inside the circle 515. The position of the 2D controller on the display may be manipulated by a dedicated user interaction 531. The superimposed model 213 may be manipulated within the 3D space 511 by applying user interactions such as rotation, panning, zooming etc. independent of the 2D controller 515 using direct user interaction with 527, similar to previous examples. Additionally, the size of the closed shape may be altered in response to user interaction such as increase or decrease the size of the closed shape. For example, increasing and decreasing the radius of the circular 2D controller 515. The 2D controller 315 may be used to efficiently examine clinical changes in diagnostic data acquired and associated in relation to the digital 3D dental models (209, 207). Such data may include fluorescence texture which may be acquired during intraoral scanning of a patient such that a digital 3D dental model of the patients dentition may be generated including dental information such as normal color texture and fluorescence color texture.

Figure 6:
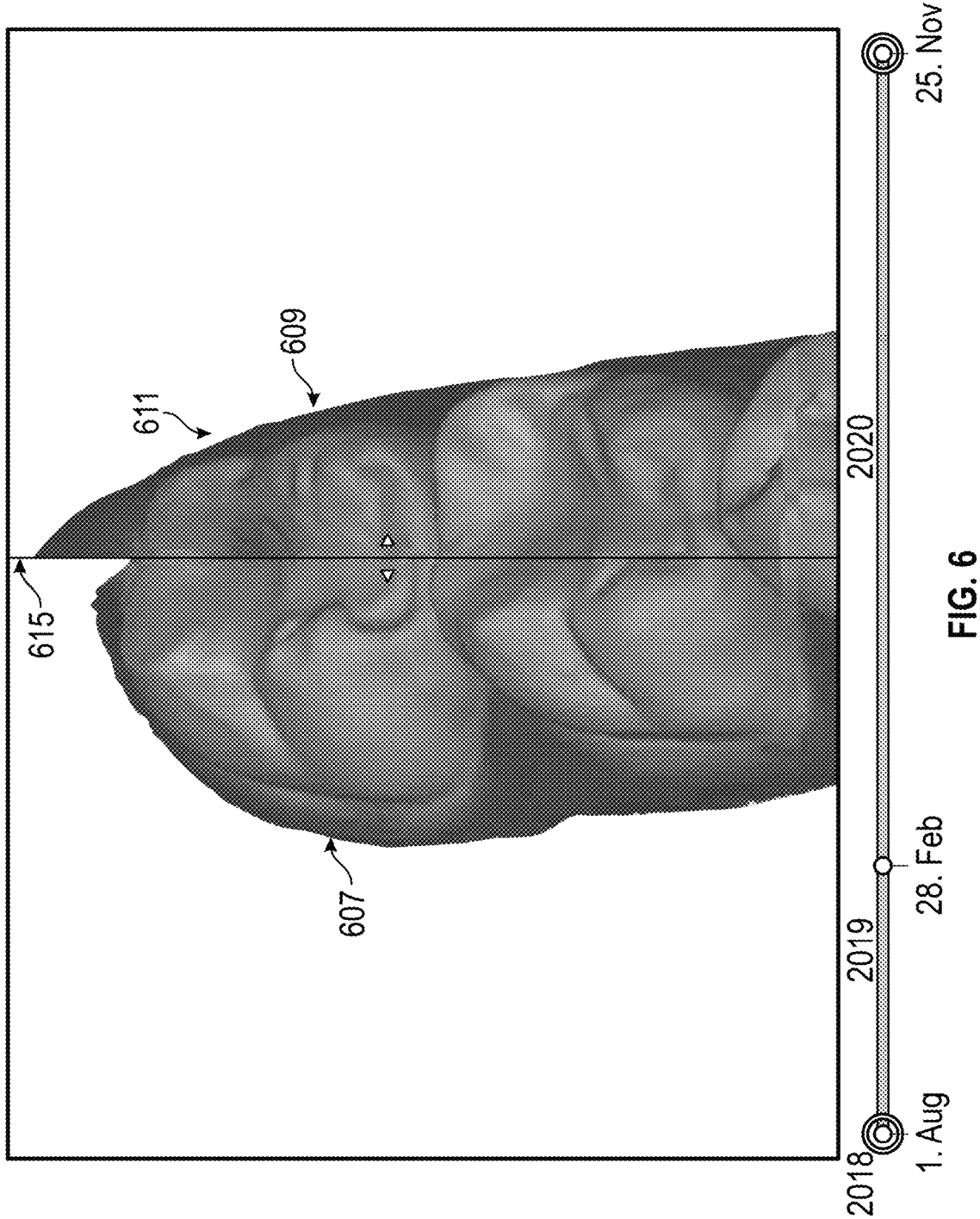
FIG. 6 illustrates superimposed dental model comprising texture data comprising fluorescence data according to an embodiment.

FIG. 6 illustrates superimposed dental model comprising texture data comprising fluorescence data from different time points according to an embodiment. The superimposed model, in the 3D space (611) includes the first and second digital 3D dental models (607, 609) that individually include fluorescence texture data from different time points. The fluorescence texture data are configured to be compared using the relative movement between the superimposed model and the 2D controller 615, allowing examination of the development in red fluorescence signal which is associated with bacterial development and may be an indicator for caries development. Other clinically relevant diagnostic comparison could be gingival recession, gingivitis development, Infrared, X-ray or other information on the internal tooth structure.

Figure 7:
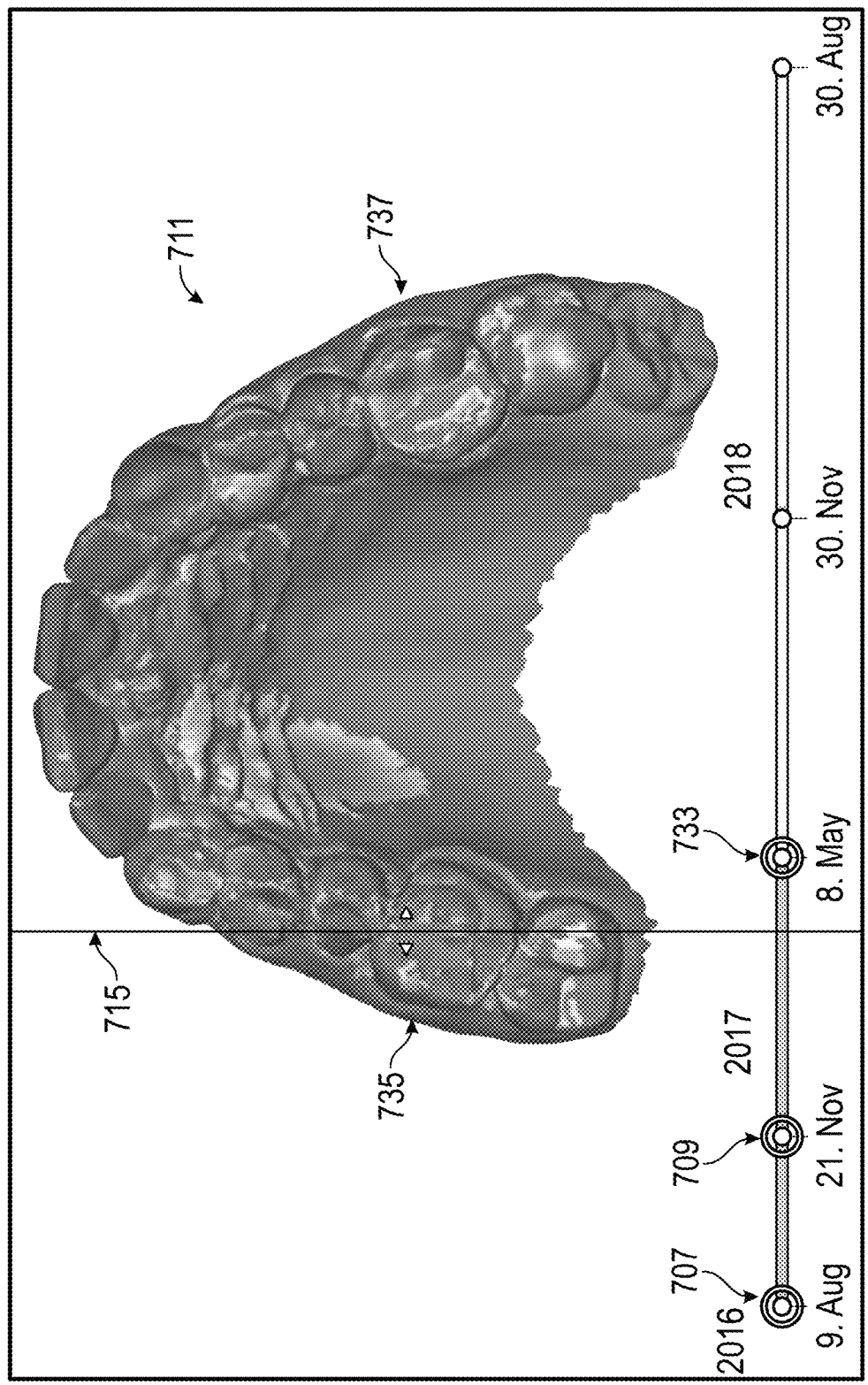
FIG. 7 illustrates superimposed model comprising rate of changes according to an embodiment.

FIG. 7 illustrates superimposed model comprising rate of changes according to an embodiment. The rate of changes may be investigated using the 2D controller. In such an example, information from more the two digital dental 3D models may be analyzed. The dental information from three or more historical points in time exists, such that a first 707, a second 709 and a third 763 digital 3D dental models may be loaded into the comparison software module. Initially the first and the second digital 3D dental models (707, 709) are superimposed to form a first superimposed 3D model 735, secondly the second and third digital 3D dental modes (709, 733) are superimposed to form a second superimposed model 737. The first and second superimposed model (735, 737) may be represented as a heatmap where the topology or textural differences is displayed as a color texture overlay. The two superimposed model (707,709) may then be rendered in the 3D space 711 in combination with a 2D controller 715 similar to previous examples as depicted in an occlusion view of the upper jaw, as shown in FIG. 7. This enables the user to investigate the rate of chances between the two superimposed model (735,737).

Figure 8:
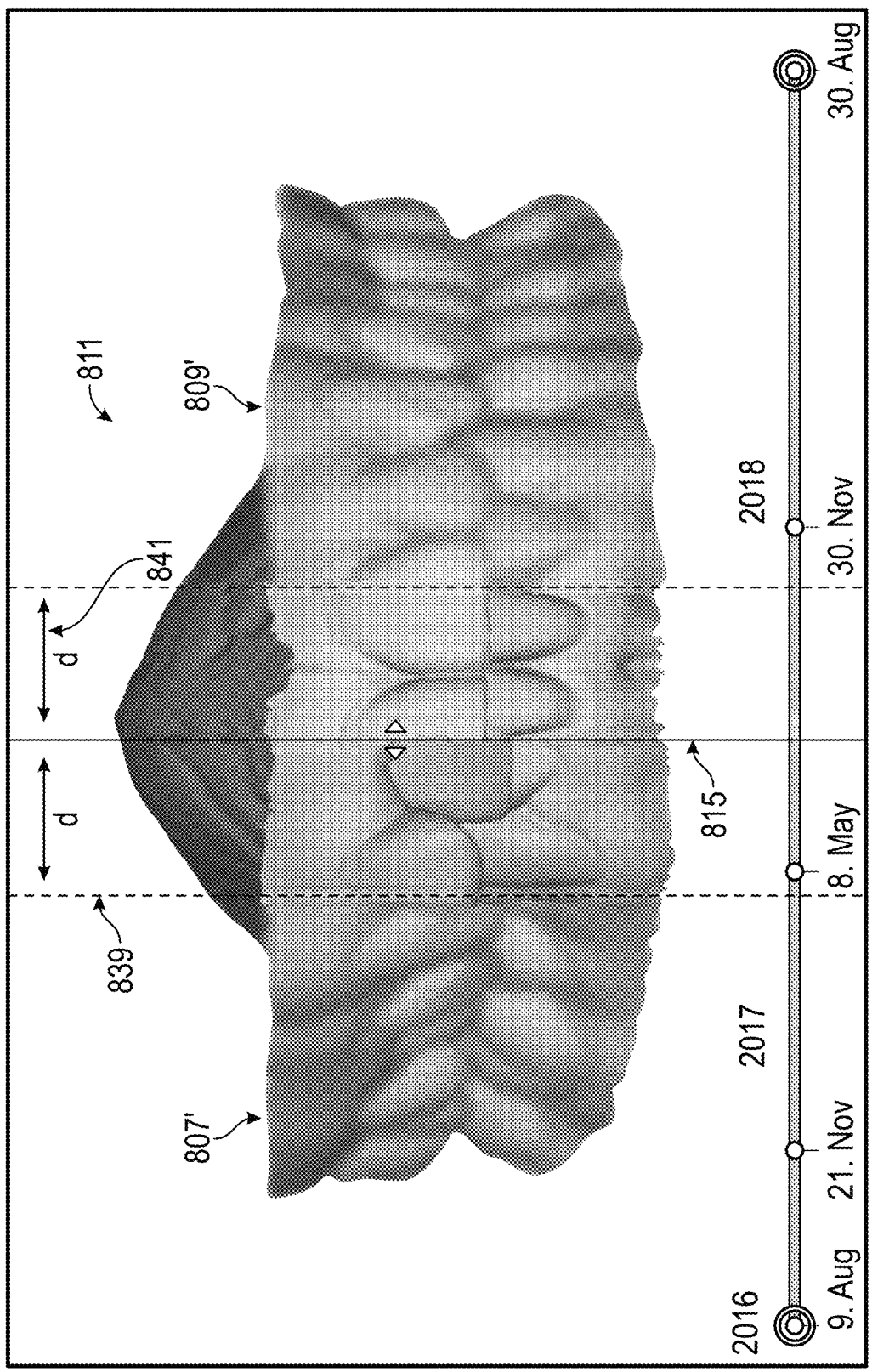
FIG. 8 illustrates 2D controller according to an embodiment.

FIG. 8 illustrates 2D controller according to an embodiment. The 2D controller 815 defines define a secondary border 839 located a distance d 841 on at least one side of the boundary created by the 2D controller in the 3D space 811. This secondary border may create a rendering resolution boundary such that data rendered between the secondary boundary 839 and the 2D controller may appear in high resolution while the part of the superimposed model 213 rendered on the other side may appear in a lower or blurred resolution. This creates a focused rendering of the part a distance d, 841 around the 2D controller 815 while the rest of the model is dimmed to reduce the information available in areas away from the region of interest controlled by the user. The user may modify the value of d in order to increase or decrease the part of the superimposed model rendered at higher resolution. 807' and 809' represents the part of the first and second digital 3D dental models in blurred or lower resolution.

Figure 9A:
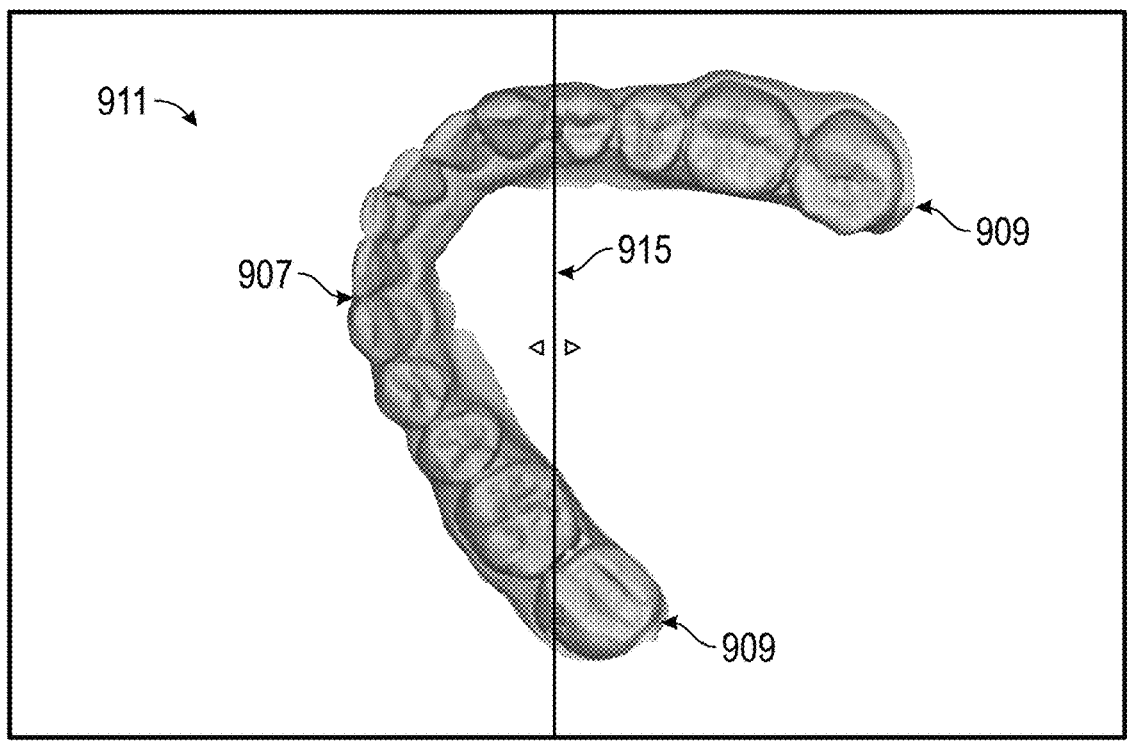
FIG. 9A illustrates rendering of disjoint parts according to an embodiment.
Figure 9B:
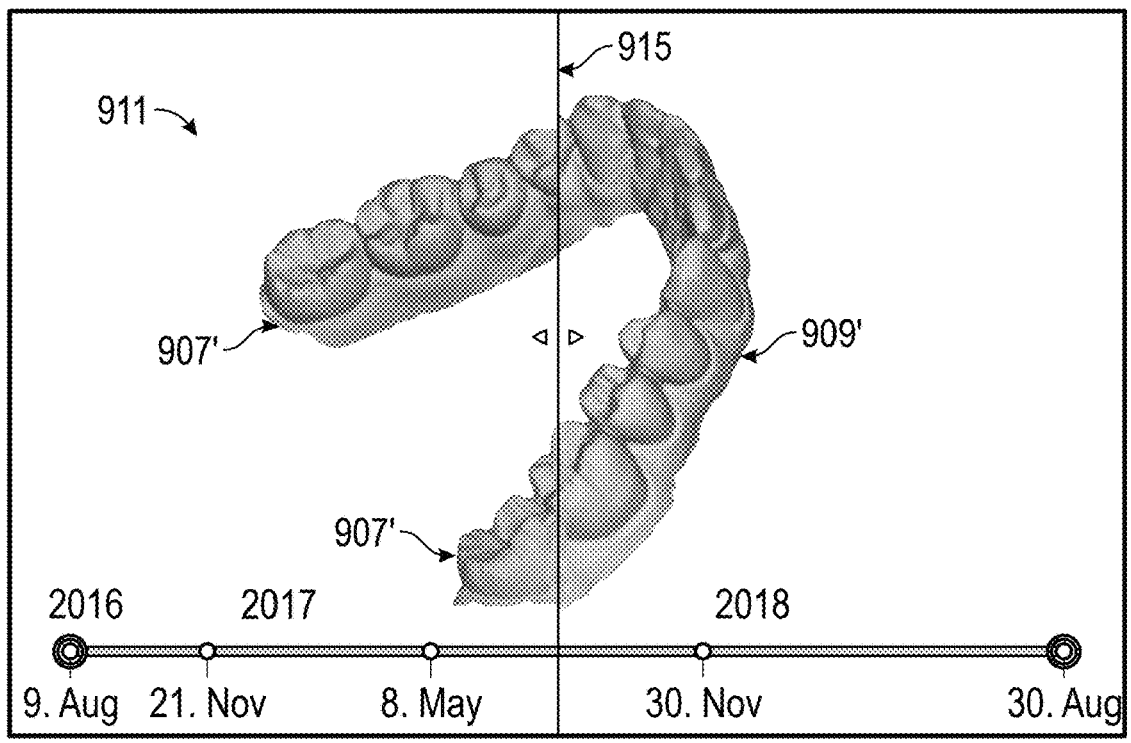
FIG. 9B illustrates rendering of disjoint parts according to an embodiment.

FIG. 9A and FIG. 9B illustrate rendering of disjoint parts according to different embodiments. The embodiments are same except the superimposed model is positioned in different perspective views and the disjoint part in FIG. 9A represent one zone whereas the disjoint parts in FIG. 9B represent another zone. The method includes at least a part of digital 3D dental model comprising disjoint parts (909, 907') of one of the first digital 3D model in the first zone or the second digital 3D model in the second zone in response to a user input corresponding to relative movement between the 2D controller 915 and superimposed model, wherein the disjoint parts are separated by at least a part (907, 909') connecting the disjoint parts (909, 907'), of another of the second digital 3D model in the second zone or first digital 3D model in the first zone.

Although some embodiments have been described and shown in detail, the disclosure is not restricted to such details, but may also be embodied in other ways within the scope of the subject matter defined in the following claims. In particular, it is to be understood that other embodiments may be utilized, and structural and functional modifications may be made without departing from the scope of the present invention.

Benefits, other advantages, and solutions to problems have been described herein with regard to specific embodiments. However, the benefits, advantages, solutions to problems, and any component(s)/unit(s) that may cause any benefit, advantage, or solution to occur or become more pronounced are not to be construed as critical, required, or essential features or components/elements of any or all the claims or the invention. The scope of the invention is accordingly to be limited by nothing other than the appended claims, in which reference to an component/unit/element in the singular is not intended to mean "one and only one" unless explicitly so stated, but rather "one or more." A claim may refer to any of the preceding claims, and "any" is understood to mean "any one or more" of the preceding claims.

As used, the singular forms "a," "an," and "the" are intended to include the plural forms as well (i.e. to have the meaning "at least one"), unless expressly stated otherwise to be limited to "only" one/single. It should be emphasized that the term "comprises/comprising/including/having" when used in this specification is taken to specify the presence of stated features, integers, operations, steps or components but does not preclude the presence or addition of one or more other features, integers, steps, components or groups thereof.

As used herein, the term "and/or" includes any and all combinations of one or more of the associated listed items. The steps of any disclosed method are not limited to the exact order stated herein, unless expressly stated otherwise.

In claims enumerating several means, several of these means can be embodied by one and the same item of hardware. The mere fact that certain measures are recited in mutually different dependent claims or described in different embodiments does not indicate that a combination of these measures cannot be used to advantage.

We claim:

1. A computer implemented method for rendering digital three-dimensional dental models of a patient, the method comprising
receiving, in a digital 3D space, a first digital 3D dental model comprising a first dental information of a patient, the first digital 3D dental model being obtained at a first time point;
receiving, in the digital 3D space, a second digital 3D dental model comprising a second dental information of the patient, the second dental information being at least partly different from the first dental information and the second digital 3D dental model being obtained at a second time point subsequent to the first time point;
generating, in the digital 3D space, a superimposed model by superimposing one of the first digital 3D dental model or the second digital 3D dental model on another of the second digital 3D dental model or the first digital 3D dental model; and
arranging, in the digital 3D space, a 2D controller and the superimposed model relative to each other such that a position of the 2D controller relative to a location of the superimposed model defines a boundary that demarcates the superimposed model between a first zone configured to render only at least a part of the first digital 3D dental model from the superimposed model and a second zone configured to render only at least a part of the second digital 3D dental model from the superimposed model;
wherein maintaining the 2D controller at the position during or after the movement of the superimposed model to the location comprises:
applying, in response to the user input, a transformation matrix to the superimposed model only, the transformation matrix corresponding to the movement of the superimposed model to a location in the digital 3D space; or
preventing application of a transformation matrix to the 2D controller, the transformation matrix corresponding to the movement of the superimposed model to a location in the digital 3D space in response to the user input; or
applying an inverse transformation matrix to the 2D controller, the inverse transformation matrix being an inverse of a transformation matrix that corresponds to the movement of the superimposed model in the digital 3D space in response to a user input.

2. The method according to claim 1, wherein
arranging the 2D controller and the superimposed model relative to each other comprises a relative movement, based on a user input, between the superimposed model and 2D controller; and
the relative movement is configured to dynamically change the first zone and second zone of the superimposed model.

3. The method according to claim 1, wherein the relative movement comprises at least one of
moving the superimposed model, relative to the 2D controller at a position, to a location in the digital 3D space such that the position of the 2D controller relative to the moved superimposed model defines the boundary for the superimposed model placed at the location; or
moving the 2D controller, relative to the superimposed model at a location, to a position such that the position of the moved 2D controller defines the boundary for the superimposed model at the location.

4. The method according to claim 1, further comprising at least one of
moving the superimposed model, relative to the 2D controller placed at a position, to a location in the digital 3D space, and maintaining the 2D controller at the position during the movement of the superimposed model to the location and/or after the movement of the superimposed model to the location until a subsequent user input to move the superimposed model to a subsequent location or to move the 2D controller to a subsequent position is provided; or
moving the 2D controller, relative to the superimposed model placed at a location, to a position in the digital 3D space, and maintaining the superimposed model at the location during the movement of the 2D controller to the position and/or after the movement of the 2D controller to the position until a subsequent user input to move the 2D controller to a subsequent position or to move the superimposed model to a subsequent location is provided.

5. A computer implemented method for rendering digital three-dimensional dental models of a patient, the method comprising
receiving, in a digital 3D space, a first digital 3D dental model comprising a first dental information of a patient, the first digital 3D dental model being obtained at a first time point;
receiving, in the digital 3D space, a second digital 3D dental model comprising a second dental information of the patient, the second dental information being at least partly different from the first dental information and the second digital 3D dental model being obtained at a second time point subsequent to the first time point;
generating, in the digital 3D space, a superimposed model by superimposing one of the first digital 3D dental model or the second digital 3D dental model on another of the second digital 3D dental model or the first digital 3D dental model; and
arranging, in the digital 3D space, a 2D controller and the superimposed model relative to each other such that a position of the 2D controller relative to a location of the superimposed model defines a boundary that demarcates the superimposed model between a first zone configured to render only at least a part of the first digital 3D dental model from the superimposed model and a second zone configured to render only at least a part of the second digital 3D dental model from the superimposed model;
wherein maintaining the superimposed model at the position during or after the movement of the 2D controller to the position comprises:
applying, in response to the user input, a transformation matrix to the 2D controller only, the transformation matrix corresponding to the movement of the 2D controller to a position in the digital 3D space; or preventing application of a transformation matrix to the superimposed model, the transformation matrix corresponding to the movement of the 2D controller to a position in the digital 3D space in response to the user input; or applying an inverse transformation matrix to the superimposed model, the inverse transformation matrix being an inverse of a transformation matrix that corresponds to the movement of the 2D controller in the digital 3D space in response to the user input.

6. The method according to claim 1, wherein superimposing comprises arranging the first digital 3D dental model and second digital 3D dental model in a fixed spatial relationship while maintaining a first data set corresponding to the first digital 3D dental model and a second data set corresponding to the second digital 3D dental model as distinct data sets after superimposing.

7. The method according to claim 1, wherein superimposing the first digital 3D dental model and second digital 3D dental model in the fixed spatial relationship displays the first digital 3D dental model and second digital 3D dental model from the same perspective; and configures the first digital 3D dental model and second digital 3D dental model for simultaneous movement in response to a user input that corresponds to moving the superimposed model, relative to the 2D controller placed at a position, to a location in the digital 3D space.

8. The method according to claim 1, wherein rendering comprises:

determining, based on the boundary, the first zone and second zone of the superimposed model based on the relative arrangement of the 2D controller and superimposed model;

identifying the at least a part of the first digital 3D model from the superimposed model located in the first zone and identifying the at least a part of the second digital 3D model from the superimposed model located in the second zone; and generating only the at least a part of the first digital 3D dental model from the superimposed model in the first zone and only the at least a part of the second digital 3D dental model from the superimposed model in the second zone.

9. The method according to claim 1, wherein the 2D controller comprises a surface; and determining the first zone and the second zone from the of the superimposed model comprises identifying a portion of the superimposed model lying on one side of the surface of the 2D controller as one of the first zone or the second zone and identifying another portion of the superimposed model as another of the second zone or the first zone.

10. A computer implemented method for rendering digital three-dimensional dental models of a patient, the method comprising receiving, in a digital 3D space, a first digital 3D dental model comprising a first dental information of a patient, the first digital 3D dental model being obtained at a first time point;

receiving, in the digital 3D space, a second digital 3D dental model comprising a second dental information of the patient, the second dental information being at least partly different from the first dental information and the second digital 3D dental model being obtained at a second time point subsequent to the first time point;

generating, in the digital 3D space, a superimposed model by superimposing one of the first digital 3D dental model or the second digital 3D dental model on another of the second digital 3D dental model or the first digital 3D dental model; and arranging, in the digital 3D space, a 2D controller and the superimposed model relative to each other such that a position of the 2D controller relative to a location of the superimposed model defines a boundary that demarcates the superimposed model between a first zone configured to render only at least a part of the first digital 3D dental model from the superimposed model and a second zone configured to render only at least a part of the second digital 3D dental model from the superimposed model;

wherein identifying the portion of the superimposed model lying on a side comprises:

directing a set of plurality of vectors in a predefined direction away from a face of the surface of the 2D controller; and identifying a portion of the superimposed model intersecting with the set of the plurality of vectors as the portion of the superimposed model lying on the one or another side of the surface.

11. A computer implemented method for rendering digital three-dimensional dental models of a patient, the method comprising receiving, in a digital 3D space, a first digital 3D dental model comprising a first dental information of a patient, the first digital 3D dental model being obtained at a first time point;

receiving, in the digital 3D space, a second digital 3D dental model comprising a second dental information of the patient, the second dental information being at least partly different from the first dental information and the second digital 3D dental model being obtained at a second time point subsequent to the first time point;

generating, in the digital 3D space, a superimposed model by superimposing one of the first digital 3D dental model or the second digital 3D dental model on another of the second digital 3D dental model or the first digital 3D dental model; and arranging, in the digital 3D space, a 2D controller and the superimposed model relative to each other such that a position of the 2D controller relative to a location of the superimposed model defines a boundary that demarcates the superimposed model between a first zone configured to render only at least a part of the first digital 3D dental model from the superimposed model and a second zone configured to render only at least a part of the second digital 3D dental model from the superimposed model;

further comprising:

determining one vector in a predefined direction from a point on the surface of the 2D controller and a model vector comprising a vector from a point on the surface of the 2D controller to a model point of one of the first digital 3D dental model or second digital 3D dental model;

determining an output based on an operation applied on the determined one vector and the model vector; and identifying, based on the output, the model point of one of the first digital 3D dental model or second digital 3D dental model being located in the first zone or second zone.

12. The method according to claim 1, wherein
the 2D controller comprises a surface that is configured to translate across a plurality of positions; and
the surface of the 2D controller extends in a direction such that a line comprising the plurality of positions or a plane comprising the plurality of positions is at least substantially orthogonal to the surface of the 2D controller.

13. The method according to claim 1, wherein rendering comprising:
clip a portion of the first digital 3D dental model overlapping with the second digital 3D dental model from the second zone, the clipped portion defining the hidden part of the first digital 3D dental model from the second zone; and
clip a portion of the second digital 3D dental model overlapping with the first digital 3D dental model from the first zone, the clipped portion defining the hidden part of the second digital 3D dental model from the first zone.

14. A computer implemented method for rendering digital three-dimensional dental models of a patient, the method comprising
receiving, in a digital 3D space, a first digital 3D dental model comprising a first dental information of a patient, the first digital 3D dental model being obtained at a first time point;
receiving, in the digital 3D space, a second digital 3D dental model comprising a second dental information of the patient, the second dental information being at least partly different from the first dental information and the second digital 3D dental model being obtained at a second time point subsequent to the first time point;
generating, in the digital 3D space, a superimposed model by superimposing one of the first digital 3D dental model or the second digital 3D dental model on another of the second digital 3D dental model or the first digital 3D dental model; and
arranging, in the digital 3D space, a 2D controller and the superimposed model relative to each other such that a position of the 2D controller relative to a location of the superimposed model defines a boundary that demarcates the superimposed model between a first zone configured to render only at least a part of the first digital 3D dental model from the superimposed model and a second zone configured to render only at least a part of the second digital 3D dental model from the superimposed model;
further comprising rendering at least a part of digital 3D dental model comprising disjoint parts of one of the first digital 3D model in the first zone or the second digital 3D model in the second zone in response to a user input corresponding to relative movement between the 2D controller and superimposed model, wherein the disjoint parts are separated by at least a part, connecting the disjoint parts, of another of the second digital 3D model in the second zone or first digital 3D model in the first zone.

15. A data processing system comprising a hardware processor configured to perform a method according to claim 1.

16. A computer program product embodied in a non-transitory computer readable medium, the computer program product including a computer readable program code being executable by a hardware data processor to cause the hardware data processor to perform a method according to claim 1 when said computer readable program code is executed by the hardware data processor.

17. A data processing system comprising a hardware processor configured to perform a method according to claim 6.

18. A computer program product embodied in a non-transitory computer readable medium, the computer program product including a computer readable program code being executable by a hardware data processor to cause the hardware data processor to perform a method according to claim 6 when said computer readable program code is executed by the hardware data processor.

19. A data processing system comprising a hardware processor configured to perform a method according to claim 11.

20. A computer program product embodied in a non-transitory computer readable medium, the computer program product including a computer readable program code being executable by a hardware data processor to cause the hardware data processor to perform a method according to claim 10 when said computer readable program code is executed by the hardware data processor.

21. A data processing system comprising a hardware processor configured to perform a method according to claim 11.

22. A computer program product embodied in a non-transitory computer readable medium, the computer program product including a computer readable program code being executable by a hardware data processor to cause the hardware data processor to perform a method according to claim 11 when said computer readable program code is executed by the hardware data processor.

23. A data processing system comprising a hardware processor configured to perform a method according to claim 14.

24. A computer program product embodied in a non-transitory computer readable medium, the computer program product including a computer readable program code being executable by a hardware data processor to cause the hardware data processor to perform a method according to claim 14 when said computer readable program code is executed by the hardware data processor.

25. The method according to claim 5, wherein maintaining the superimposed model at the position during or after the movement of the 2D controller to the position comprises:
applying, in response to the user input, a transformation matrix to the 2D controller only, the transformation matrix corresponding to the movement of the 2D controller to a position in the digital 3D space.

26. The method according to claim 5, wherein maintaining the superimposed model at the position during or after the movement of the 2D controller to the position comprises:
preventing application of a transformation matrix to the superimposed model, the transformation matrix corresponding to the movement of the 2D controller to a position in the digital 3D space in response to the user input.

27. The method according to claim 5, wherein maintaining the superimposed model at the position during or after the movement of the 2D controller to the position comprises:
applying an inverse transformation matrix to the superimposed model, the inverse transformation matrix being an inverse of a transformation matrix that corresponds to the movement of the 2D controller in the digital 3D space in response to the user input.

* * * * *